(12) United States Patent
Hanson et al.

(10) Patent No.: US 12,008,316 B2
(45) Date of Patent: Jun. 11, 2024

(54) MACHINE ASSISTED ANALYSIS OF DOCUMENTS

(71) Applicant: Citizn Company, Denver, CO (US)

(72) Inventors: Otto Hanson, Lakewood, CO (US); William Mooz, Boulder, CO (US); Evan Harris, Lakewood, CO (US); Benjamin Golopol, Denver, CO (US); Theo Culhane, Denver, CO (US)

(73) Assignee: CITIZN COMPANY, Centennial, CO (US)

( * ) Notice: Subject to any disclaimer, the term of this patent is extended or adjusted under 35 U.S.C. 154(b) by 256 days.

(21) Appl. No.: 17/408,005

(22) Filed: Aug. 20, 2021

(65) Prior Publication Data

US 2022/0058338 A1 Feb. 24, 2022

Related U.S. Application Data

(60) Provisional application No. 63/068,845, filed on Aug. 21, 2020.

(51) Int. Cl.
| | | |
|---|---|---|
| *G06F 40/205* | (2020.01) | |
| *G06N 20/00* | (2019.01) | |
| *G06Q 30/018* | (2023.01) | |
| *G06Q 50/18* | (2012.01) | |
| *G08B 21/18* | (2006.01) | |

(52) U.S. Cl.
CPC .......... *G06F 40/205* (2020.01); *G06N 20/00* (2019.01); *G06Q 30/018* (2013.01); *G06Q 50/18* (2013.01); *G08B 21/18* (2013.01)

(58) Field of Classification Search
CPC ...... G06N 20/00; G06Q 50/18; G06Q 30/018; G06F 40/205
See application file for complete search history.

(56) References Cited

U.S. PATENT DOCUMENTS

| | | | | |
|---|---|---|---|---|
| 8,209,278 B1* | 6/2012 | Straus | ..................... | G06F 40/10 |
| | | | | 706/62 |
| 11,688,017 B1* | 6/2023 | Callahan | ................ | G06Q 40/08 |
| | | | | 705/4 |
| 2002/0165726 A1* | 11/2002 | Grundfest | .............. | G06Q 10/10 |
| | | | | 705/311 |
| 2010/0250313 A1* | 9/2010 | Crocker | ............... | G06Q 30/018 |
| | | | | 705/317 |
| 2015/0032645 A1* | 1/2015 | McKeown | .............. | G06F 16/93 |
| | | | | 705/311 |
| 2015/0213568 A1* | 7/2015 | Follis | ..................... | G06Q 50/18 |
| | | | | 705/311 |
| 2018/0268506 A1* | 9/2018 | Wodetzki | ................ | G06N 5/046 |
| 2019/0266196 A1* | 8/2019 | Boyce | ....................... | G06N 3/08 |

(Continued)

*Primary Examiner* — Samuel G Neway
(74) *Attorney, Agent, or Firm* — Davis Graham & Stubbs LLP

(57) ABSTRACT

A document analysis system (100) for use by legal or business users is described. The system (100) includes a number of user devices 102 that communicate with a processing platform (104) to upload documents and receive reports concerning the documents. The illustrated platform (104) includes a processor (112), a document database (114), a preprocessing module (115), a machine learning module (116), a repository for analytics (118), and a report generator (120). A user can upload contracts or other documents to the platform (104) and receive scoring and ratings information for the contract.

24 Claims, 29 Drawing Sheets

(56) References Cited

U.S. PATENT DOCUMENTS

| | | | | |
|---|---|---|---|---|
| 2020/0380530 A1* | 12/2020 | Trim | .................... | G06Q 30/018 |
| 2021/0125297 A1* | 4/2021 | Doran | .................... | G06N 20/00 |
| 2022/0058338 A1* | 2/2022 | Hanson | .................. | G08B 21/18 |

* cited by examiner

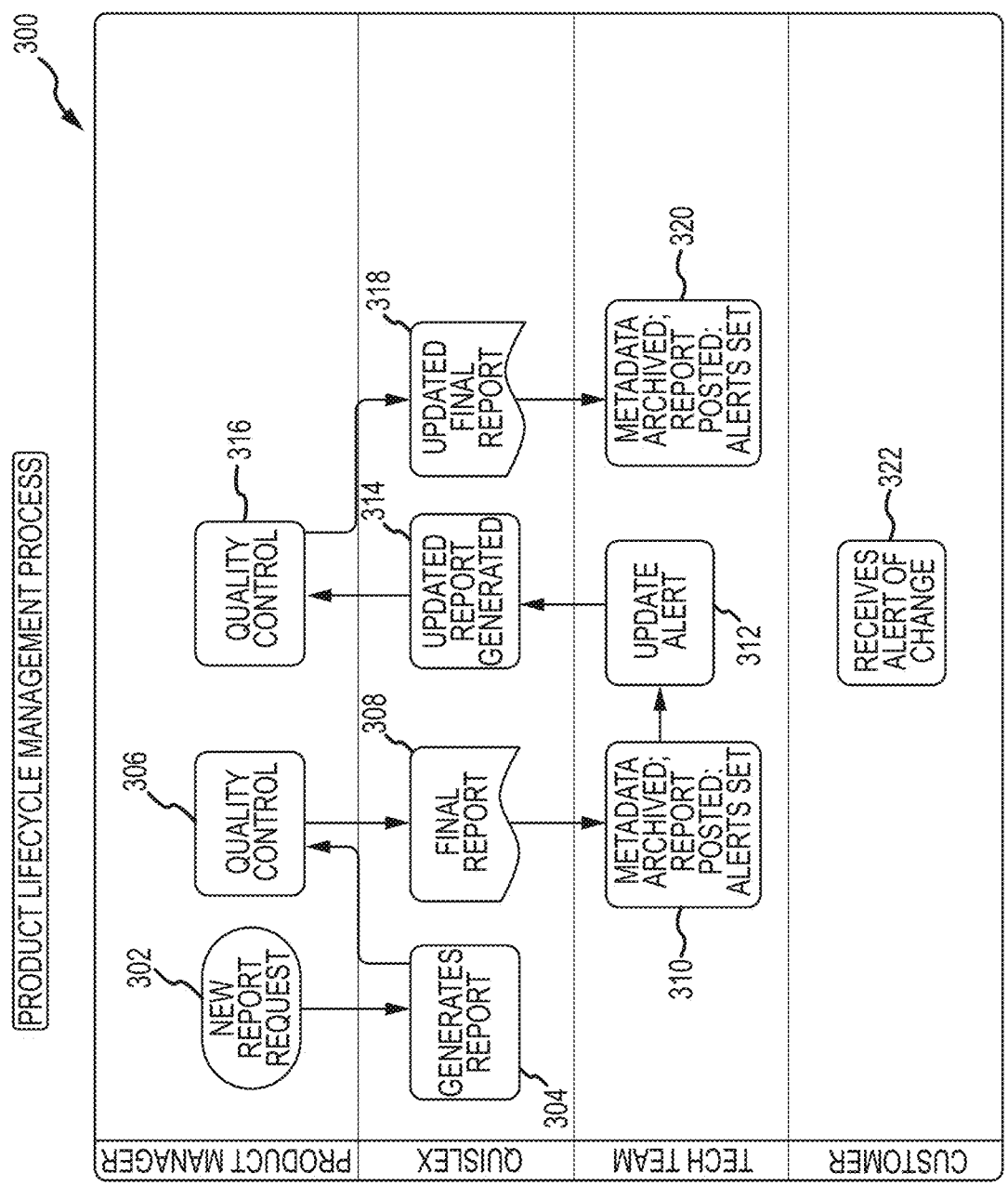

SpaceTime    Stats    Contract Hub    Admin ▼    Alerts ▼    ML Scores                                evan    LIVE    SIGN OUT DASHBOARD                                                                                                        Auto-save On

| SOURCE DOCUMENTS | Documents | | | | Search ✕ ↵ ↻ ⊞ | | |
|---|---|---|---|---|---|---|---|
| REPORTS | Actions | Agreement Name | Defined Term | URL | Last Successful Scrape | Document Type | Primary Agreement |
| LIMITS ON VENDOR'S LIABILITY ⊘ | ▦ ← ≡ ⚙ ✎ | Terms and Conditions | TAC | https://recruitee.com/en/terms#service | 2021-07-11 00:00:00 | Primary Vendor Contract | Yes |
| LIMITS ON CUSTOMER'S LIABILITY ⊘ | ▦ ← ≡ ⚙ ✎ | Data Processing Addendum | DPA | https://recruitee.com/en/terms#service | 2021-07-11 00:00:00 | Data Security Policy Addendum | No |
| INDEMNIFICATION BY VENDOR ⊘ | ▦ ← ≡ ⚙ ✎ | Service Level Addendum | SLA | https://recruitee.com/en/terms#service | 2021-07-11 00:00:00 | Service Level Agreement | No |
| INDEMNIFICATION BY CUSTOMER ⊘ | ▦ ← ≡ ⚙ ✎ | Privacy Policy | PP | https://recruitee.com/en/privacy | 2021-07-11 00:00:00 | Privacy Policy | No |

FIG.5

| | | | LIVE | | SIGN OUT |
|---|---|---|---|---|---|
| 🚀 SpaceTime | Stats | | | | Auto-save On |
| | | | ↵ | ↻ | ⊞ |
| DASHBOARD | 2.3 | Any fraudulent, abusive, improper or unauthorized use of the services or use in violation of the Agreement may be reason for Recruitee, as it deems appropriate to suspend, terminate or cancel Subscriber's right to use the Services or to access the Site. One person or legal entity may not maintain more than one free Comapny Account. Subscriber may not resell or otherwise provide the Services to any thrid party as a private label, with the inclusion of a mark-up fee or otherwise without the express written consent of Recruitee. If approved by Recruitee in writing, multiple Company Accounts may fall under a single Subscription. Recruitee is not liable for any loss or damage resulting from Subscriber's failure to comply with the obligations set out in this article, including the loss of control over a Company Account. | | Primary Agreement |
| SOURCE DOCUMENTS | | | | | |
| REPORTS | 2.4 | For the sake of clarity and without prejudice to additional attribution to others, all use of Access Rights will be attributed to the Subscriber in the context of the Agreement. An End-User that is not the Subscriber does not derive any rights from these Terms. | | | Yes |
| LIMITS ON VENDORS LIABILITY | 3.1 | The SaaS may only be used by Subscriber to transmit and store Subscriver Content. Subscriber may not upload commercial advertisements to the Services that do not fall within the definition of Subscriber Content or use the Services to send spam. | | | No |
| LIMITS ON CUSTOMERS LIABILITY | 3.2 | If the usage under a Company Account of Subscriber is excessive and endangers the availability or stability of Recruitee's services for other customers of Recruitee, then Recruitee may suspend the respective Company Account. | | | No |
| INDEMNIFICATION BY VENDOR | 4.1 | Recruitee may offer to distribute Job Advertisements through various Distribution Channels. Recruitee may in its sole discretion charge additional fees for Job Advertisements. All fees for Job Advertisements will be communicated by Recruitee during the ordering process for Job Advertisements. | | | No |
| INDEMNIFICATION BY CUSTOMER | | | | | |

FIG. 6

DASHBOARD

SOURCE DOCUMENTS

REPORTS

| LIMITS ON VENDOR'S LIABILITY | ⊘ |

LIMITS ON CUSTOMER'S LIABILITY ⊘

INDEMNIFICATION BY VENDOR ⊘

INDEMNIFICATION BY CUSTOMER ⊘

CONFIDENTIAL INFORMATION ⊘

REVIEW          CONTRACT LANGUAGE

Auto-save On

Limits on Vendor's Liability

Contract ID: baf133b90f6763373e70ad93e229e1a5c 🔗          Completion: 100
                                                          Confidence: 97

101 ⊕

Does the contract explicitly limit Vendor's liability?

Answer ⚹ ⊘ ≡ 🗐 ∞

| Yes ✗ | ✗ | ˅ |        Confidence  | Full Confidence (99%) | ˅ |

Linked Questions: 102, 105, 107, 108          Create QC Issue

102 ⊕

What is Vendor's liability cap?

Answer ⚹ ⊘ ≡ 🗐 ∞

| <12 months' fees ✗ | ✗ | ˅ |    Confidence    | xxx | ˅ |

Linked Questions: 101, 105, 107, 108          Create QC Issue

FIG.7

Citation - Q:101     Auto-save On                                                                    ✕

Citation

7, TAC

Source Language

Subscriber expressly understands and agrees that Recruitee is not liable for damages and/or losses resulting from: (i) the use or inability to use the Services; (ii) the cost of procurement of substitute goods and services resulting from any goods, data, information or services purchased or obtained or messages received or transactions entered into through or from the Services; (iii) statements or conduct of any third party on the Services. RECRUITEE SHALL NEVER BE LIABLE FOR INDIRECT OR CONSEQUENTIAL DAMAGES, INCLUDING LOST PROFITS, THE RECRUITING OR NOT RECRUITING OF PARTICULAR INDIVIDUALS AND/OR LOSSES OF SUBSCRIBER AND/OR THIRD PARTIES. RECRUITEE'S TOTAL LIABILITY ARISING OUT OF OR RELATED TO THE AGREEMENT WILL NOT EXCEED THE FEES (CALCULATED PRO RATA) FOR THE CONTINUED PROVISION FOR SIX MONTHS OF ANY SAAS PROVIDED BY RECRUITEE TO SUBSCRIBER UNDER THE AGREEMENT IMMEDIATELY PRIOR TO THE FIRST OCCURRENCE GIVING RISE TO SUBSCRIBER'S CLAIM(S) AGAINST RECRUITEE ("LIABILITY CAP"). THE LIABILITY CAP APPLIES TO: (I) ANY DAMAGES; (II) ALL CLAIMS IN THE AGGREDGATE, INCLUDING BREACH OF CONTRACT, BREACH OF WARRANTY, INDEMNITY, NEGLIGENCE, STRICT LIABILITY, MISREPRESENTATIONS, AND OTHER TORTS. The limitations as set out in this article will not apply in so far as liability cannot be limited under applicable laws and regulations, such as in the case of deliberate recklessness, fraud, or malintent of Recruitee. The limitations specified in this article will apply even if any limited remedy specified in the Agreement is found to have failed of its essential purpose. Any limitations agreed upon under this article will also apply to the liability of Recruitee's directors, officers, employees, contractors, agents and members.

ML Recommendations

7, TAC  [ACCEPT]

Subcriber expressly understands and agrees that Recruitee is not liable for damages and/or losses resulting from: (i) the use or inability to use the Services; (ii) the cost of procurement of substitute goods and services resulting from any goods, data, information or services purchased or obtained or messages received or transactions entered into through or from the Services; (iii) statements or conduct of any third party on the Services. RECRUITEE SHALL NEVER BE LIABLE FOR INDIRECT OR CONSEQUENTIAL DAMAGES, INCLUDING LOST PROFITS, THE RECRUITING OR NOT RECRUITING OF PARTICULAR INDIVIDUALS AND/OR LOSSES OF SUBSCRIBER AND/OR THIRD PARTIES. RECRUITEE'S TOTAL LIABILITY ARISING OUT OF OR RELATED TO THE AGREEMENT WILL NOT EXCEED THE FEES (CALCULATED PRO RATA) FOR THE CONTINUED PROVISION FOR SIX MONTHS OF ANY SAAS PROVIDED BY RECRUITEE TO SUBSCRIBER UNDER THE AGREEMENT IMMEDIATELY PRIOR TO THE FIRST OCCURRENCE GIVING RISE TO SUBSCRIBER'S CLAIM(S) AGAINST RECRUITEE ("LIABILITY CAP"), THE LIABILITY CAP APPLIES TO: (I) ANY DAMAGES; (II) ALL CLAIMS IN THE AGGREGATE, INCLUDING BREACH OF CONTRACT, BREACH OF WARRANTY, INDEMNITY, NEGLIGENCE, STRICT LIABILITY, MISREPRESENTATIONS, AND OTHER TORTS. The limitations as set out in this article will not apply in so far as liability cannot be limited under applicable laws and regulations, such as in the case of deliberate recklessness, fraud, or malintent of Recruitee. The limitations specified in this article will apply even if any limited remedy specified in the Agreement is found to have failed of its essential purpose. Any limitations agreed upon under this article will also apply to the liability of Recruitee's directors, officers, employees, contractors, agents and members.

FIG.8

Scoring

Overall Rating: Balanced (-3.03)
Overall Clarity: High (98.81)

Trigger Scoring Re-run

Hide topics

---

Limits on Vendor's Liability

Very Favorable (4.00)
High (98.50)

---

Limits on Customer's Liability

Very Unfavorable (-18.00)
High (99.50)

---

Indemnification by Vendor

Very Favorable (11.00)
High (99.50)

---

Indemnification by Customer

Very Unfavorable (-26.40)
High (99.50)

Fig. 10

| Answer Scoring | | | | | Search | ✕ Auto-save On |
|---|---|---|---|---|---|---|
| Actions | Question Id | Question | Answer Id | Answer Choice | Positive Rating | Negative Rating |
| ✏ | 101 | Does the contract explicitly limit Vendor's liability? | 1 | No | S > 30 | |
| ✏ | 101 | Does the contract explicitly limit Vendor's liability? | 2 | Yes | | |
| ✏ | 101 | Does the contract explicitly limit Vendor's liability? | 3 | Unclear | | |
| ✏ | 101 | Does the contract explicitly limit Vendor's liability? | 4 | Answer varies | | |
| ✏ | 102 | What is the Vendor's liability cap? | 5 | Complete disclaimer of all liability | | S > B |

20 rows ▼ |< < 1-20 of 810 > >|

FIG.11

| Answers | | | | | | | | |
|---|---|---|---|---|---|---|---|---|
| Actions | Id | Question Id | Rank | Topic | Subtopic | Answer Choice | Answer Display | Answer Header |
| ˅ ✎ 🗑 | | 101 | 0 | Limits on Vendor's Liability | Liability Cap | No | No | Liability Cap |

Auto-save On
External Guidance

This means there are no limits on the vendor's potential liability under this Agreement. If you are harmed by this vendor, your chances of recovering the full extent of the harm are higher than usual.

Answer Title
Vendor's liability is unlimited.

Unanswer Title

Answer Key: 0
Implied by Omission: Yes

Recruitee

TERMSCOUT RATING ⊕

Balanced

CONTRACT OVERALL

★★★☆☆

ⓜ recruitee

Primary Document:
Last Updated
Overall Clarity ⊕

Terms and Conditions ("TAC")
July 10, 2021
High

CERTIFIED
BALANCED
TERMS
TEAM SCOUT

Contract Category:
Category Best in Class ⊕
Category Average ⊕

Applicant Tracking Systems
★★★★☆
★★★☆☆

BUILD A PDF REPORT

Key Topics to Consider

Pros

⊘ Indemnification by Vendor ⊕
⊘ Data Basics ⊕
⊘ Limits on Vendor's Liability ⊕

Cons

⊗ Disputes ⊕
⊗ Limits on Customer's Liability ⊕
⊗ Indemnification by Customer ⊕

Topic Analysis

| TOPIC | RATING | CLARITY | RANK | SOURCE |
|---|---|---|---|---|
| ⊞ Limits on Vendor's Liability | Very Favorable | High | 5 of 9 | Citation |
| ⊞ Limits on Customer's Liability | Very Unfavorable | High | 8 of 9 | Citation |
| ⊞ Indemnification by Vendor | Very Favorable | High | 2 of 9 | Citation |
| ⊞ Indemnification by Customer | Very Unfavorable | High | 5 of 9 | Citation |

FIG.14

Summary Details

⊗ Liability Cap

Frequency
Less than 12 months' fees 1 out of 9 companies in this ategory have this provision.

Guidance
This means that if something goes wrong with this vendor, their maximum liability to you is capped at the amount of fees you paid in a specified amount of time that is less than 12 months. See citation for exact formula.

Source Language

7, TAC
- Subscriber expressly understands and agrees that Recruitee is not liable for damages and/or losses resulting from: (i) the use or inability to use the Services; (ii) the cost of procurement of subsitute goods and servcies resulting from any goods, data information or services purchased or obtained or messages received or transactions entered into through or from the Services; (iii) statements or conduct of any third party on the Services. RECRUITEE SHALL NEVER BE LIABLE FOR INDIRECT OR CONSEQUENTIAL DAMAGES, INCLUDING LOST PROFITS, THE RECRUITING OR NOT RECRUITING OF PARTICULAR INDIVIDUALS AND/OR LOSSES OF SUBSCRIBER AND/OR THIRD PARTIES. RECRUITEE'S TOTAL LIABILITY ARISING OUT OF OR RELATED TO THE AGREEMENT WILL NOT EXCEED THE FEES (CALCULATED PRO RATA) FOR THE CONTINUED PROVISION FOR SIX MONTHS OF ANY SAAS PROVIDED BY RECRUITEE TO SUBSCRIBER UNDER THE AGREEMENT IMMEDIATELY PRIOR TO

FIG.16

Limits on Vendor's Liability

Very Favorable      High      5 of 9      Citation

| | LIABILITY CAP | DAMAGE WAIVER | CITATIONS | CATEGORY BREAKDOWN | |
|---|---|---|---|---|---|
| Workable | ★★★★★ | 4.5 / 5 | | | |
| SmartRecruiters | ★★★★★ | 4.5 / 5 | Ceipal | ★☆☆☆☆ | 0.5 / 5 |
| JazzHR | ★★★★★ | 4.5 / 5 | Zoho Recruit | ★☆☆☆☆ | 0.5 / 5 |
| Greenhouse | ★★★★★ | 4.5 / 5 | iCIMS | ★☆☆☆☆ | 0.5 / 5 |
| Recruitee | ★★★★★ | 4.5 / 5 | iCIMS | ★☆☆☆☆ | 0.5 / 5 |

FIG.17

| Limits on Vendor's Liability | Very Favorable | High | 5 of 9 | Citation |

LIABILITY CAP    DAMAGE WAIVER    CITATIONS    CATEGORY BREAKDOWN

7, TAC
- Subscriber expressly understands and agrees that Recruitee is not liable for damages and/or losses resulting from: (i) the use or inability to use the Services; (ii) the cost of procurement of substitute goods and services resulting from any goods, data, information or services purchased or obtained or messages received or transactions entered into through or from the Services; (iii) statements or conduct of any third party on the Services. RECRUITEE SHALL NEVER BE LIABLE FOR INDIRECT OR CONSEQUENTIAL DAMAGES, INCLUDING LOST PROFITS, THE RECRUITING OR NOT RECRUITING OF PARTICULAR INDIVIDUALS AND/OR LOSSES OF SUBSCRIBER AND/OR THIRD PARTIES. RECRUITEE'S TOTAL LIABILITY ARISING OUT OF OR RELATED TO THE AGREEMENT WILL NOT EXCEED THE FEES (CALCULATED PRO RATA) FOR THE CONTINUED PROVISION FOR SIX MONTHS OF ANY SAAS PROVIDED BY RECRUITEE TO SUBSCRIBER UNDER THE AGREEMENT IMMEDIATELY PRIOR TO THE FIRST OCCURRENCE GIVING RISE TO THE SUBSCRIBER'S CLAIM(S) AGAINST RECRUITEE ("LIABILITY CAP"), THE LIABILITY CAP APPLIES TO: (i) ANY DAMAGES; (ii) ALL CLAIMS IN THE AGGREGATE, INCLUDING BREACH OF CONTRACT, BREACH OF WARRANTY, INDEMNITY, NEGLIGENCE, STRICT LIABILITY, MISREPRESENTATIONS, AND OTHER TORTS. The limitations as set out in this article will not apply in so far as liability cannot be limited under applicable laws and regulations, such as in the case of deliberate recklessness, fraud, or malintent of Recruitee. The limitations specified in this article will also apply to the liability of Recruitee's directors, officers, employees, contractors, agents and members.

FIG.18

MACHINE ASSISTED ANALYSIS OF DOCUMENTS

CROSS REFERENCE TO RELATED APPLICATION

This application claims the benefit of U.S. Provisional Patent Application No. 63/068,845, entitled, "MACHINE ASSISTED ANALYSIS OF DOCUMENTS," filed on Aug. 21, 2020. The contents of the above-noted application are incorporated herein as if set forth in full and priority to this application is claimed to the full extent allowable under U.S. law and regulations.

FIELD OF THE INVENTION

The present invention relates generally to machine assisted, substantive review of documents and, in particular, to an at least partially automated system for reviewing source documents such as contracts or other legal documents to identify potential issues and provide qualitative analysis of document terms.

BACKGROUND OF THE INVENTION

Contracts are an important determiner of success for individuals and businesses. For example, a typical business may have entity formation and governance agreements, commercial lease agreements, employment agreements, master services agreements, supply and distribution agreements, vendor agreements, licenses, and settlement agreements, among others. These agreements may determine the rights, responsibilities, risks, and profitability of the business. Because of the frequency and importance of contracts, companies expend significant time and resources in negotiating, drafting, and monitoring contracts. The efforts may involve officers, managers, in-house contract officers and attorneys, and outside counsel. For many companies, this is a substantial component of the company's overall workforce efforts.

In a typical process, the parties may first agree to the general business terms intended to govern the business relationship between the parties. One of the parties may then be responsible for providing a draft document that, hopefully, reflects the basic deal points agreed to by the parties. Almost invariably, this initial draft includes many "standard" terms that implement and supplement the basic deal points but that were not specifically addressed in the initial deal points. The other party may then review the initial draft and propose revisions and additions. Many rounds of revisions and negotiation may occur before a final version of the agreement is executed. In many cases, this process interrupts the momentum of the parties and delays important business objectives. In some cases, this process can degrade the level of trust between the parties or even break relationships that had promising potential.

Throughout this process, multiple individuals on each side may draft and revise contract terms and conditions. Generally, the individuals seek to implement the understanding of the parties but also to protect important interests of their own, sometimes in an adversarial manner. Those experienced and skilled in analyzing particular terms in particular contexts will often be able to recognize whether a given term favors one party or the other, with respect to a particular consideration, and to what degree. However, parties with limited experience and resources may have difficulty in drafting, reviewing, or revising a term so that it reflects the desired goals and negotiating position of the party.

Parties with regular experience in a particular field and dedicated resources have an advantage in this regard. Their contract specialists may have many examples and templates to refer to in drafting and revising provisions or replacing draft provisions. Moreover, these templates and examples may reflect a range of options corresponding to a range of favorability with respect to one party or another (e.g., depending on which side the company was on in prior agreements). However, companies with less experience and resources may have more difficulty, and incur more expense and delay, in developing a proposed term of appropriate scope. Even well-established companies can experience these difficulties in new areas. As a result, generating contract terms of the desired scope and reviewing proposed terms can be expensive and time-consuming, but the alternative is worse.

In recent years, applications have been developed to assist in preparation of standard agreements and other documents. Many of these are directed to generating a template for common types of documents. For example, a user may navigate through an interface to enter certain information such as the name and address of the business entity, type of document needed, jurisdiction of residence, and the like. The application can then generate a draft document with some degree of customization. In some cases, users may answer more detailed questions or select as between optional terms. These applications generally allow users to generate certain basic legal documents or contracts efficiently and at little or no expense. These applications are of limited value in relation to evaluating existing documents or draft documents.

SUMMARY OF THE INVENTION

The present invention is directed to a system and associated functionality for substantive analysis of source documents such as contracts or other legal documents. The system is machine assisted, e.g., using machine learning such as artificial intelligence, so as to enable rapid, substantive analysis of document provisions. A user (e.g., a legal or business user of a company or other entity) can thereby obtain timely feedback concerning the favorability of document terms in relation to objective standards for particular industries and contexts. In addition, documents can be monitored over time to identify and analyze any changes. Documents can also be certified as fair or in compliance with accepted standards to facilitate trust and accelerate negotiations. In this manner, delays and disruption of relationships can be reduced and mutually beneficial relationships are enhanced.

In accordance with one aspect of the present invention, a document analysis system and associated functionality are provided. The system includes an interface and an input module for obtaining intake information. The interface allows the system to access a source document. For example, a source document, such as a proposed contract for analysis, may be uploaded to a system platform by a user. Alternatively, instructions may be provided to the system platform to enable the platform to access the source document. For example, a URL may be provided whereby the system can access a contract that is available online. The input module receives classification information regarding the source document. For example, the classification information may indicate a document type and/or a type of goods or services involved. It will be appreciated that customary terms and conditions may vary depending on the nature of the contract and the industry involved. The classification information may be explicitly provided by a user, inferred from the source document, or determined by a subject matter expert based on an initial review of the source document, among other possibilities. It will thus be appreciated that the input module may involve a customer facing user interface, an internal interface of the document analysis system, and/or an API, as well as associated processors and network communications devices.

The system further includes a database of reference documents or document provisions and a processing system. The database preferably includes document provisions indexed by at least one of provision type and goods or services involved. Thus, for example, in connection with a system used to analyze commercial contracts such as supply agreements or vendor agreements, reference provisions stored in the database may be indexed to the industry or industry segment involved as well as the type of provision such as pricing, delivery and acceptance, representations and warranties, indemnification, and the like. The processing system is operative to receive the source document and the classification information regarding the source document, obtain one or more parsed provisions of the source document and access the database to obtain reference information regarding the referenced document provisions. In this regard, the processing system may obtain parsed provisions together with metadata or descriptions of the parsed provisions to facilitate identification of corresponding reference provisions from the database. Alternatively, the processing system may be operative to ingest the full sample document, parse the document and analyze the provisions to identify the type of provision and goods or services involved. In this regard, the processing system may include a preprocessing module to provide an enhanced document dataset for analysis. For example, the preprocessing module may annotate the provisions with headings, topic identifiers, and the like and may involve abstracting the document with scoring and ratings elements. For example, such abstracting may involve answering a series of standardized questions for specific topics and associating scoring elements with the answers. This process may be manual, semi-manual, or fully automated.

The processing system is further operative to generate one or more metrics based on an analysis of the parsed document provisions and reference information. For example, this may involve employing a machine learning module to perform a textual analysis of the parsed document provisions in relation to the reference information. Based on this analysis, the system may determine, among other things, how favorable the provision is with respect to one of the parties, whether the provision is fair or in accordance with industry standards, and/or whether the provision satisfies any requirements specific to a particular user. The system may then generate a report using the metrics and provide the report to a system user. For example, the report may include information concerning a favorability of the source document or any of its provisions, an overall score for the document relating to its favorability with respect to one or more of the parties, a fairness rating, a summary or examples of industry-standard terms, or any other information to assist the user in evaluating the suitability of the source document or any of its terms.

In accordance with another aspect of the present invention, a system and associated functionality are provided for monitoring a source document over time to identify and analyze any changes. In some cases, a contract or other document may be allowed to change periodically at the discretion of one of the parties. For example, certain vendor contracts may specify that certain terms are governed by online provisions that may be changed by the vendor. In such cases, it has been found useful to provide an automated service for periodically accessing the document, comparing the current document to the original source document, identifying any changes and generating a report when such changes are deemed material. An associated document analysis system includes an interface for receiving the source document, an input module for receiving classification information regarding the source document indicating at least one of a document type in a type of goods or services involved, and an alert module for monitoring changes to the source document and selectively generating an alert based on the monitoring.

BRIEF DESCRIPTION OF THE DRAWINGS

For a more complete understanding of the present invention, and further advantages thereof, reference is now made to the following detailed description, taking in conjunction with the drawings, in which:

FIGS. 2A-2I illustrate a process for analyzing a document using the document analysis system of FIG. 1;

FIG. 3 illustrates a product life cycle management process in accordance with the present invention;

FIGS. 5-20 are user interface screenshots further illustrating the functionality of the document analysis system of FIG. 1.

DETAILED DESCRIPTION

In the following description, the invention is set forth in the context of specific features and architectures for implementing a machine assisted system for receiving and analyzing contracts or other legal documents. This represents a particularly advantageous application of the present invention to address a problematic context common to many businesses. However, it will be appreciated that the invention is more broadly applicable in analyzing a variety of types of source documents and many alternate features may be provided in accordance with the present invention. Accordingly, the following description should be understood as exemplary and not by way of limitation.

Figure 1:
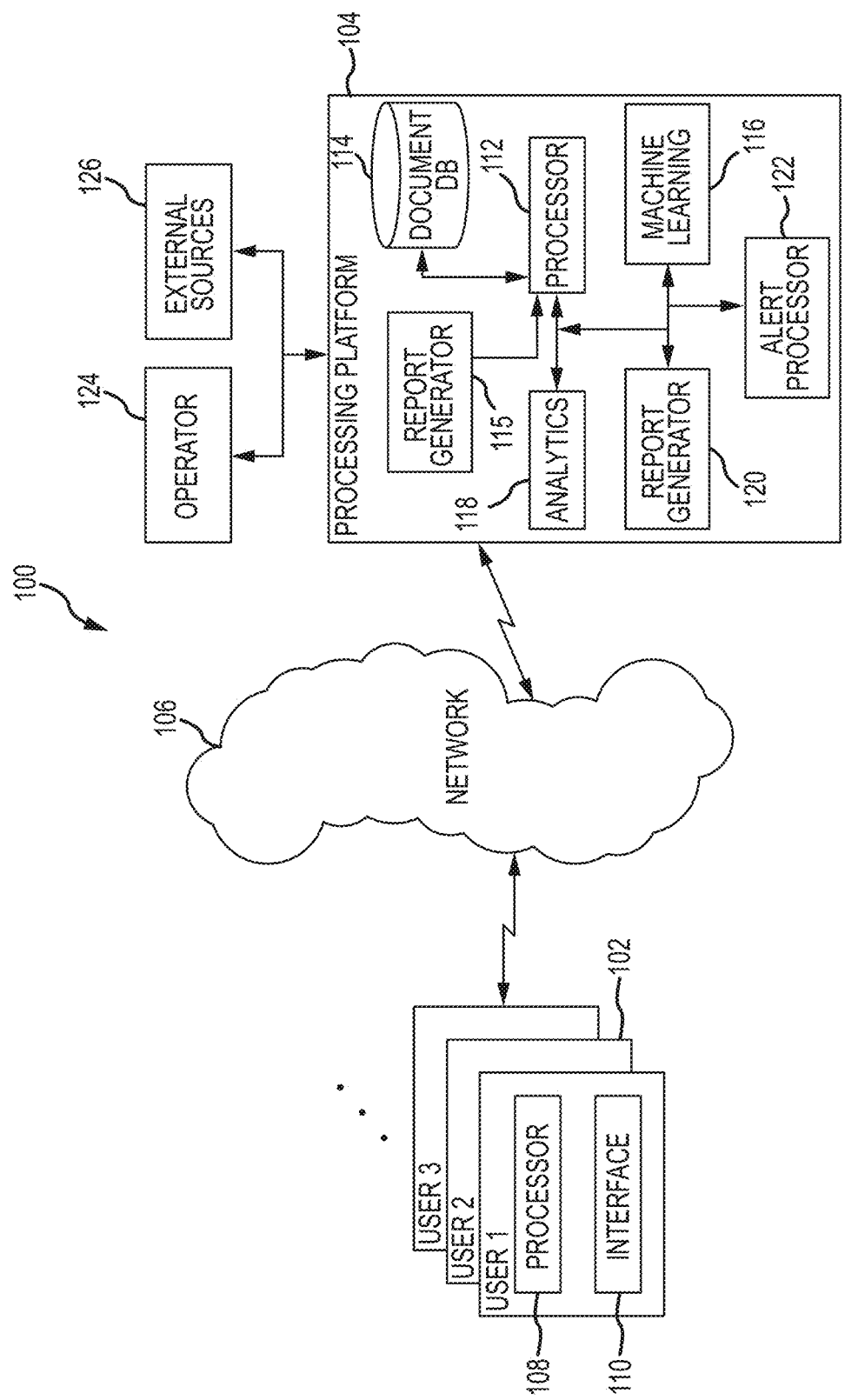
FIG. 1 is a schematic diagram of a document analysis system in accordance with the present invention.

FIG. 1 illustrates a document analysis system 100 in accordance with the present invention. The illustrated system 100 includes a number of user devices 102 that communicate with a processing platform 104. As will be described in more detail below, the system 100 processes and stores sample document provisions in a database. Accordingly, it is convenient for users and efficient for system operation to implement the system 100 as a network-based application. In the illustrated embodiment, the user devices 102 interact with the processing platform 104 via a wide area network 106 such as the Internet. In this regard, the processing platform 104 may be a cloud-based platform and may be implemented on multiple machines disposed at a single location or geographically distributed.

The user devices 102 may be embodied in a mobile phone, a tablet, a laptop, a desktop or other computer-based device. As shown, each of the user devices 102 includes a processor 108 and interface module 110. The interface module 110 allows a user to upload source documents and other information to the processing platform 104, render user interface screens associated with the system 100, receive reports, and execute related functionality. The processor 108 processes inputs from the user, manages communications with the processing platform 104 via the network 106, and enables interaction with reports and other documents. Many user devices 102 may interact with the processing platform 104. Indeed, one advantage of the invention is that it is expected that a rich and detailed database of document provisions may be developed over time based on analyzing and processing documents submitted by multiple users. It will be appreciated that appropriate security measures may be implemented in connection with the platform 104 in order to protect sensitive and confidential information of users.

As noted above, the processing platform 104 may be distributed across multiple machines at multiple locations. For purposes of illustration, a single processing platform 104 is depicted. The illustrated platform 104 includes a processor 112, a document database 114, a preprocessing module 115, a machine learning module 116, a repository for analytics 118, and a report generator 120. The processor 112 manages interaction of the various elements of the processing platform 104 as well as managing communications with the user devices 102, operators 124, and external sources 126. In this regard, and is described in more detail below, the processor 112 may receive source documents from the user devices 102, parse the source documents into provisions, and access the database 112, preprocessing module 115, and machine learning module 116 to process the source documents. Moreover, the processor 112 may associate metadata with document provisions, e.g., identifying the document type, provision type, and goods or services implicated, to assist in storing the documents in the database 114 for future use and in accessing documents.

The database 114 stores documents and document provisions to assist in document analysis. In this regard, the provisions may be indexed in relation to document type, provision type, an industry identifier, and/or goods and services involved so as to enable comparisons with corresponding provisions. For example, in the context of commercial contracts, examples of document types include supply agreements, commercial leases, license agreements, reseller agreements, and master services agreements, among others. In the same context, examples of provision types may include pricing, delivery and acceptance, representations and warranties, and indemnification, among others. Examples of industry identifiers include identifiers for consumer goods, raw materials, construction materials, medical devices, advertising, consumer information, medical information, and many others. Finally, examples of goods and services include groceries, consumer products, household goods, medical supplies, medical services, insurance, advertising, and manufacturing among many others. It will be appreciated that the database 114 may be structured in any matter that is useful in a given context and may include different numbers of indexes and different types of indexes depending on the context.

The preprocessing module performs a number of functions to prepare the document data for processing by the machine learning module 116 as well as to otherwise facilitate analysis, scoring, and rating. For example, the module 115 may involve annotating and/or abstracting document provisions as described below. The machine learning module 116 is operative to perform a qualitative analysis of provisions of a source document using reference provisions stored in the database 114. Based on this analysis, the module 116 may determine that a given provision of a source document, or the overall source document, is more or less favorable with respect to a given party, is rated as fair or in compliance with industry standards, is missing certain provisions that are common, includes provisions that are uncommon, or may provide any other information that assists a user in understanding the nature and characteristics of the source document. In this regard, the machine learning module 116 may perform a number of functions. First, the machine learning module may perform a textual analysis of headings and individual provisions to identify the type of provision. In addition, the module 116 may analyze the text of the provision to understand a content of the provision including terms and conditions. The module can then use the results of this analysis to qualitatively compare a provision to corresponding provisions stored in the database 114 to establish a rating or score of the provision in relation to the stored provisions based on specified or evolving criteria, or to provide a summary or generate questions to guide analysis by the user.

In this regard, the machine learning module 116 may employ artificial intelligence to implement these functions. The artificial intelligence may be supervised or unsupervised and may involve a set of training data relating to common industry provisions. However, the artificial intelligence preferably continues to develop criteria for analyzing provisions based on experience. A subject matter expert such as a supervising attorney may review the results of the analysis by the machine learning module 116 and enter corrections or modifications to further assist the machine learning module 116 in developing analytical tools.

As a result of this analysis, the machine learning module 116 may develop a number of analytics with respect to a source document that can be stored in repository 118. These analytics may include favorability ratings or scores with respect to individual provisions of the source document. These ratings or scores may be reported to a user or combined to yield an overall score with respect to the source document. The analytics may further include summary information, descriptions of terms, warnings concerning missing or unusual terms, and other textual information.

These analytics may be used by a report generator 122 to generate a report for the user. Various types of reports can be provided. Simple reports may include an overall favorability rating or score for the source document. More detailed reports may include analysis with respect to specific terms. The report may also include a number of focused questions based on the analysis. Users may also request a report that includes a certification that a submitted source document is fair or complies with defined industry standards. For example, a source document may be considered fair if it is substantially neutral in that it does not favor one party or another more than a specified amount.

As will be understood from the description below, a number of operators 124 may interact with the processing platform 104. For example, these operators may include project managers, contract analysts, reviewers, and supervising attorneys. For purposes of efficiency, scalability, and objectivity, it is desirable to have many of the functions be machine implemented. However, there are a number of functions that may be performed or assisted by operators 124 at least initially. For example, operators 124 may be involved in conducting an initial scan of a source document to identify the document type, provision types, industry involved, and competitors or peers. The operators may also collect and import available reference documents of competitors or peers. In addition, operators 124 may review intermediate results at various stages to identify errors. Finally, operators 124 may be involved in reviewing final results such as reports to ensure quality control. These operators may interact with the processing platform 104 via workstations that access to processing platform 104 via a local area network, wide area network or the like.

In some cases, the processing platform may access external sources 126. A variety of such sources may be accessed for a variety of purposes. For example, in connection with analyzing and indemnification provision of a contract, the processing platform 104 may desire to access an external source 126 to obtain information about the resources of the indemnifying party. In the context of monitoring changes to a source document, the processing platform 104 may periodically access a URL where the document is published so as to enable a comparison of the current document to the original source document. In such cases, the changes may be analyzed by an alert processor 122 to determine whether such changes are material and, if so, to generate an alert to transmit to the user. There are a variety of other contexts where it may be useful for the processing platform 104 to communicate with external sources 126.

FIGS. 2A-2I illustrate a process 200 for reviewing a document using the document analysis system. These figures map the process 200 with respect to two dimensions. The first dimension, presented as columns, indicates the stage of the review including an intake stage, a review stage, a finalization and export stage, and a maintenance stage. The second dimension, presented as rows, indicates the person or entity involved at each stage of the process 200, including the user or client, the project manager (in this case, the Term Scout Project Manager or TSPM), other analysts (in this case, partner Quislex), and automated processes and technology.

In the intake stage, the process 200 is initiated by a client by submitting (202) a source document. A project manager retrieves (204) the document and performs an initial analysis (206) to assign industry and product codes. Such industry and product codes may be assigned by reference to a public or proprietary database 208. The project manager may also determine (210) whether the source document needs to be redacted. For example, the source document may be redacted to anonymize the document or protect confidential information. Some information, for example, pricing information, may be made available for limited purposes of the analysis while being protected from other disclosure. It will be appreciated that the source document may be a confidential document provided by a user or a public document, for example, published at a specified URL. In the case of a user supplied document, the document may be redacted (212) and then exported (214) to a system database 216. In other cases, the document may be exported to the database 216 without redaction.

Continuing with the intake stage, it is useful to compare the source document to corresponding contracts such as contracts of competitors. In this regard, a user may be prompted to identify competitors as part of a user interface. If the user has identified competitors (218), competitor contracts 220 may be obtained and compiled (222). Otherwise, competitors may be identified (224), for example, by reference to proprietary or public databases. The source document and competitor contracts are then passed on for use in the review stage.

In the review stage, a master question list template is selected (226). The master question list sets forth a series of questions that guide the review process and provide a basis for evaluating the source document as to favorability, fairness, and other criteria. The list may relate to such things as, for example, are warranties provided, what warranties, what are the triggering events, what are the limits on the warranties, is there a corresponding indemnification for breach, what are the limits on indemnification, and what amount of assets back the indemnification. It will be appreciated that different questions are applicable to different types of contracts in different industries and different questions may be generated with respect to different types of provisions. Accordingly, template selection (226) may be based on any or all of these criteria or others.

The template can then be used by an analyst to conduct (228) the source document review. This process may be manual, automated, or a combination thereof. For example, a machine learning module may be employed to conduct textual analysis and yield ratings or score information related to specific provisions. In connection with this review, the analyst may determine (230) that comments are needed. For example, the analyst may inquire whether particular terms are needed for the source document, whether the user has provided any specific standards as to terms that are required or desirable, or the like. If comments are required, the analyst may transmit (232) comments to the project manager who then provides (234) answers, if available. These comments can then be used by the analysts to complete (236) the master question list. If no comments are needed, the master question list may be completed without transmitting comments to the project manager. In either case, the master question list developed from the master question list template based on the review of the source document, yields a list of questions regarding the source document to assist the user in analyzing the source document. For example, the master question list may include questions concerning whether the source document needs to be amended to include certain industry standard terms, whether the source document needs to be amended to exclude certain terms that are not in accordance with industry standards, whether the assignment of certain rights and responsibilities as between the parties is appropriate, and others.

The process 200 then passes to the finalization and export stage. At this stage, the project manager may review (238) the master question list for quality control purposes. If the master question lists passes (240), the master question list may be exported (242) to a report generator 244. If not, the master question list is returned to the review stage for quality control analysis (246) by the project manager. The report generator 244, in the illustrated embodiment, is an automated process for generating reports including the master question list. The reports may also include ratings or score information relating to favorability, a certification, or other information to assist the user in evaluating the source document. The resulting report may also undergo quality control (248). If the report passes (250) quality control, it is transmitted (252) to the client. Otherwise, the report is passed to a technology team (254) for processing to generate a revised report.

A number of additional functions may be provided in connection with the maintenance stage. As noted above, it is expected that the document analysis system will generate a rich and detailed database of document provisions and related information. This is facilitated by processing source documents and related analysis to enrich the database. To that end, the master question list and report may be exported to the database 256. In this manner, the system can develop a report catalog 258 and a master question list catalog 260.

The source document may also be monitored (262) for future changes. For example, if a contract is published at a given URL, the system may periodically access the URL to obtain the current form of the document. The original source document can then be compared to the current document to identify any changes. The resulting changes can be analyzed to determine whether they are material. In this regard, materiality may be determined based on criteria specified by user, whether the changes affect provisions that are deemed to be material, whether the changes result in a substantial change to a favorability rating or score, or other criteria.

The alert process is triggered (264) by accessing the current document. This may be based on a periodic monitoring process or by an indication of a potential change to the source document. A determination (266) is then made as to whether changes have been made to the source document. For example, this may involve an automated textual comparison of the current document to the original source document. If no changes have been made, this is noted (268) and the monitoring process continues. However, if changes have occurred, a black lined version of the document indicating revisions is generated for review (270) by the project manager. A determination is then made (272) regarding whether the changes are material as described above. If not, this is noted (274). If the changes are deemed material, a further determination is made (276) as to whether the changes affect the master question list. If not, the changes are deemed immaterial. However, if the changes affect the master question list, a still further determination is made (278) as to whether the change is significant. If not, the change may be recorded in the database 256 but does not necessitate an updated report or alert. However, if the change is significant, a new master question list template is selected (226) and the process described above is repeated to generate a new report or alert based on the change.

Figure 2A:
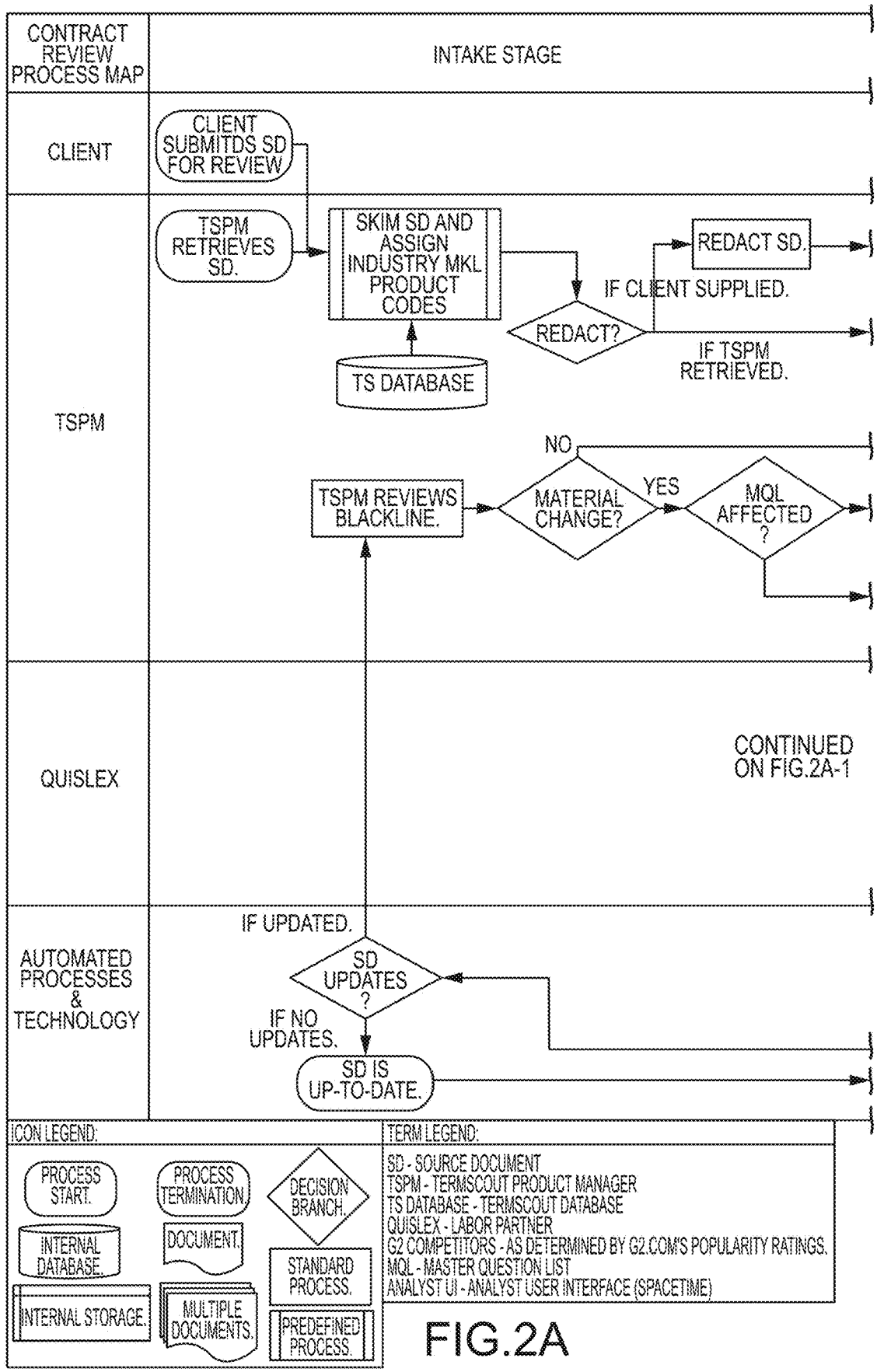
Figures 1, 2A:
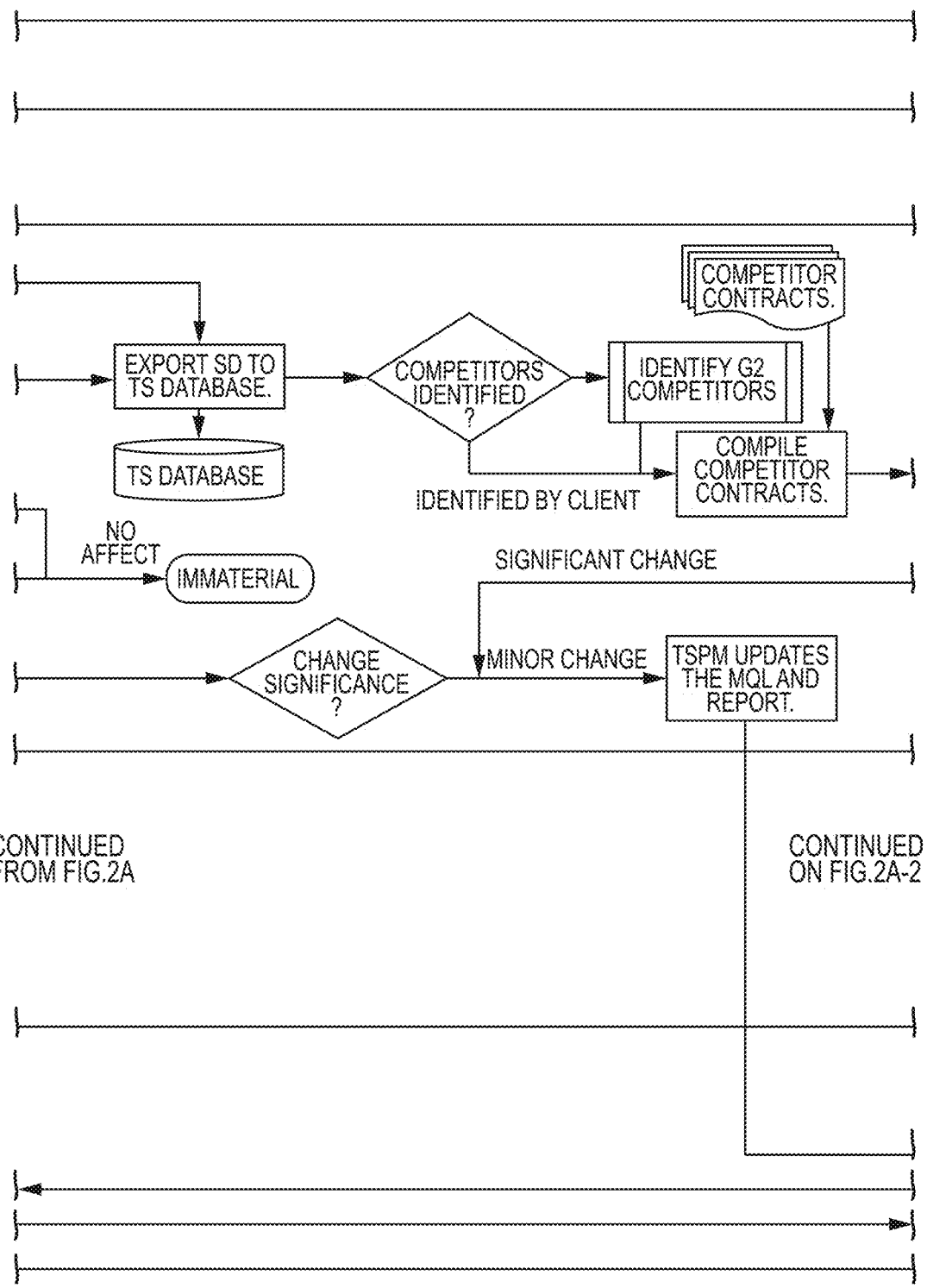
Figures 2, 2A:
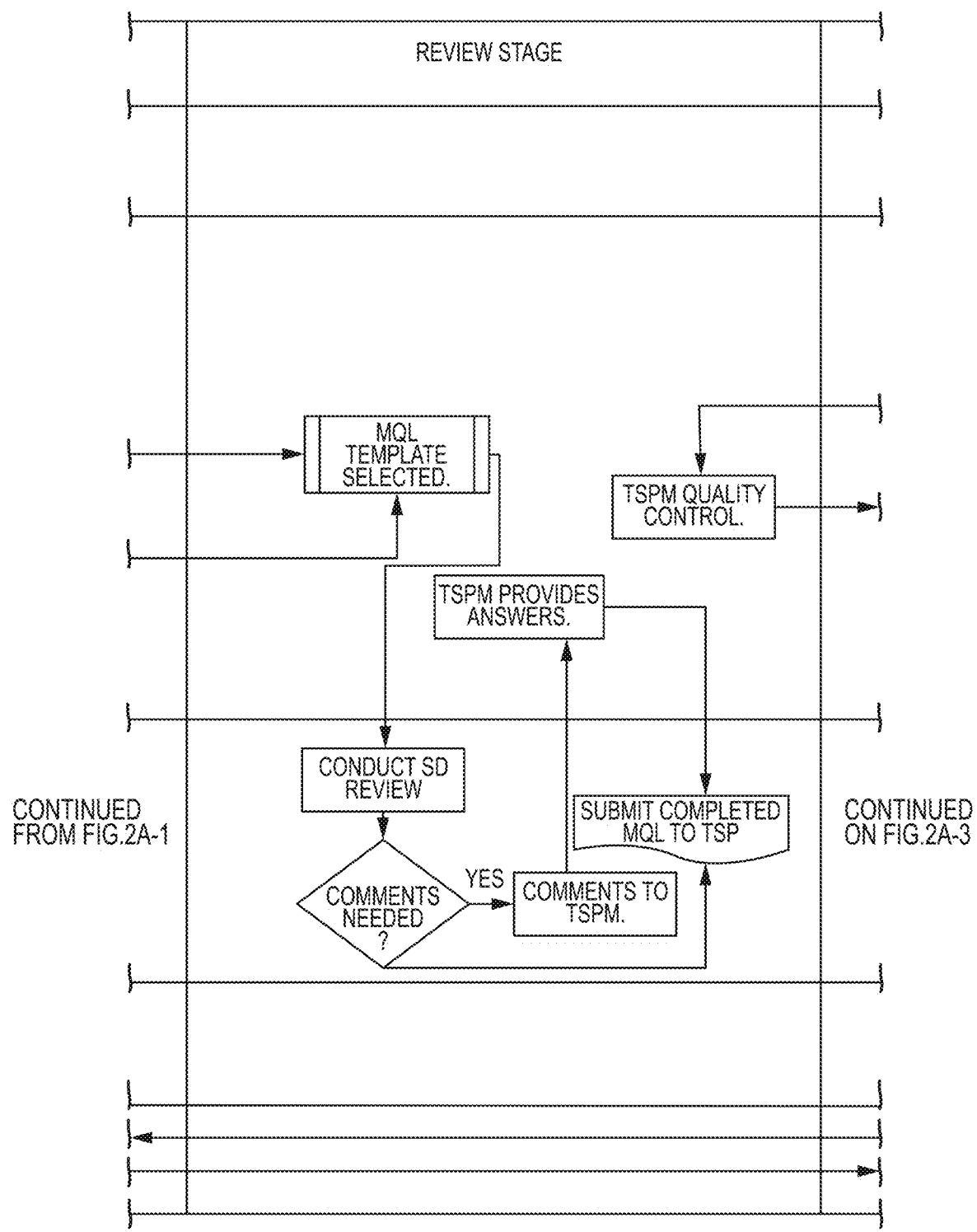
Figures 2, 2A, 3:
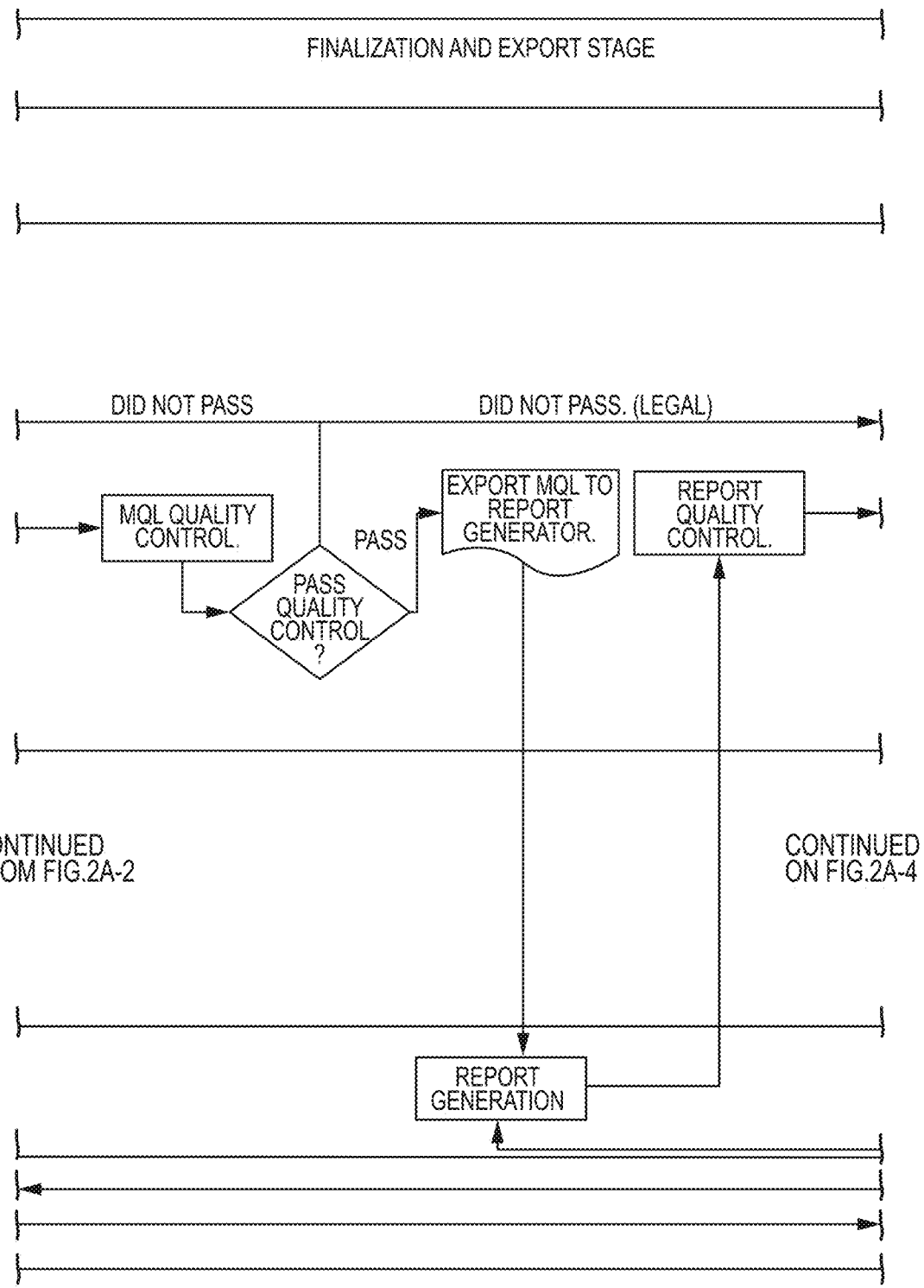

FIG. 3 illustrates a product lifecycle management process 300. The process 300 relates to the lifecycle of generating reports and updates for documents having an ongoing monitoring function. The illustrated process 300 is initiated when the product manager requests (302) a report related to a monitored document. The analyst then generates (304) a report. For example, the report may indicate where updates may be obtained, how often the document should be monitored or what conditions trigger a review, and what conditions may trigger a report. The report is then reviewed (306) for quality control purposes and a final report 308 is generated. The tech team can then process the report (310) to archive metadata, post the report and set alert conditions.

When the conditions for an alert are satisfied, and update alert may be generated (312) as well as an updated report (314). In addition, an alert of change may be transmitted (322) to the user. The updated report is processed (316) for quality control purposes and an updated final report is generated (318). The tech team can then process (320) the updated final report to archive metadata, post the report, and set alerts.

Figures 2, 2A, 3, 4:
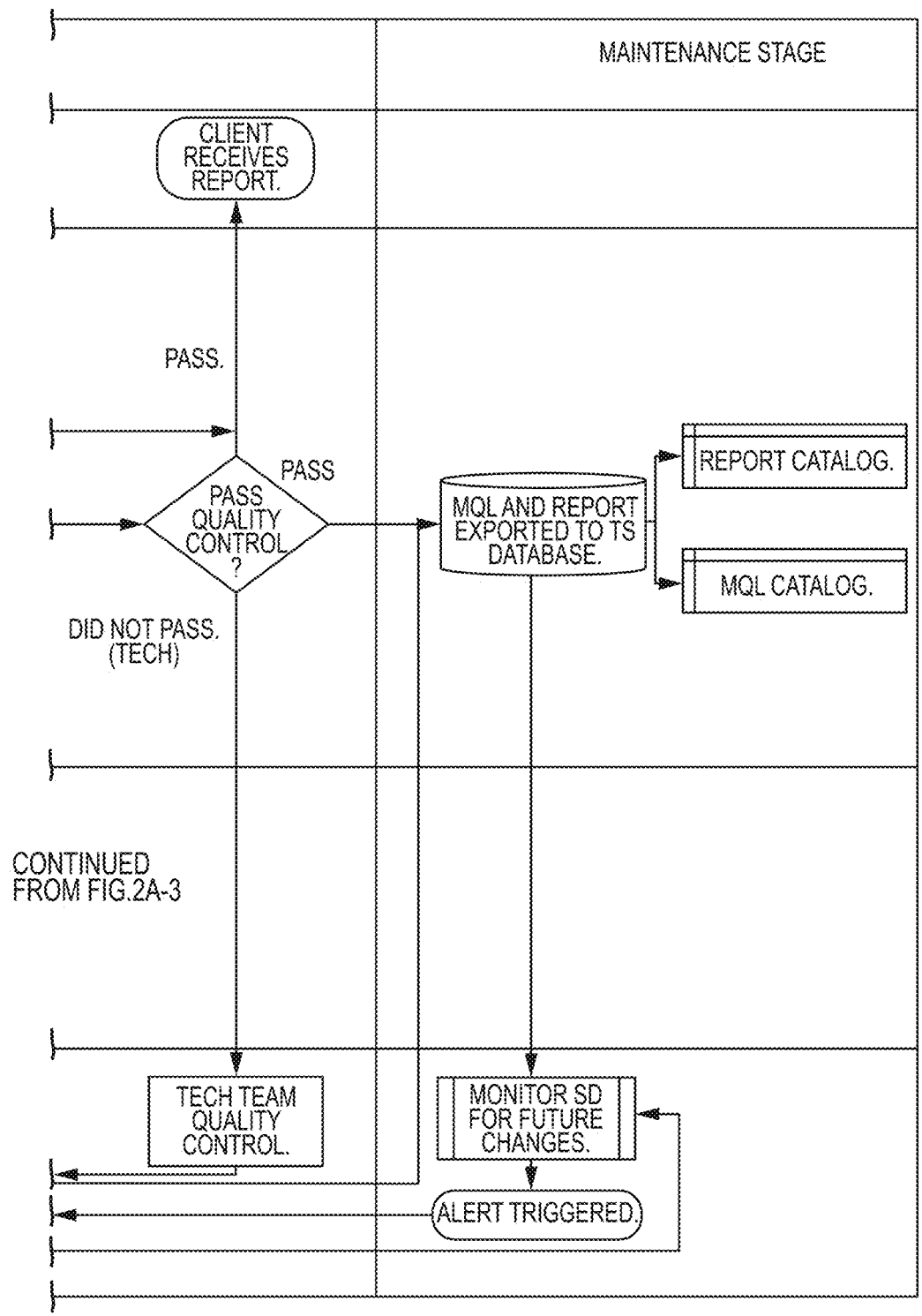
Figure 2B:
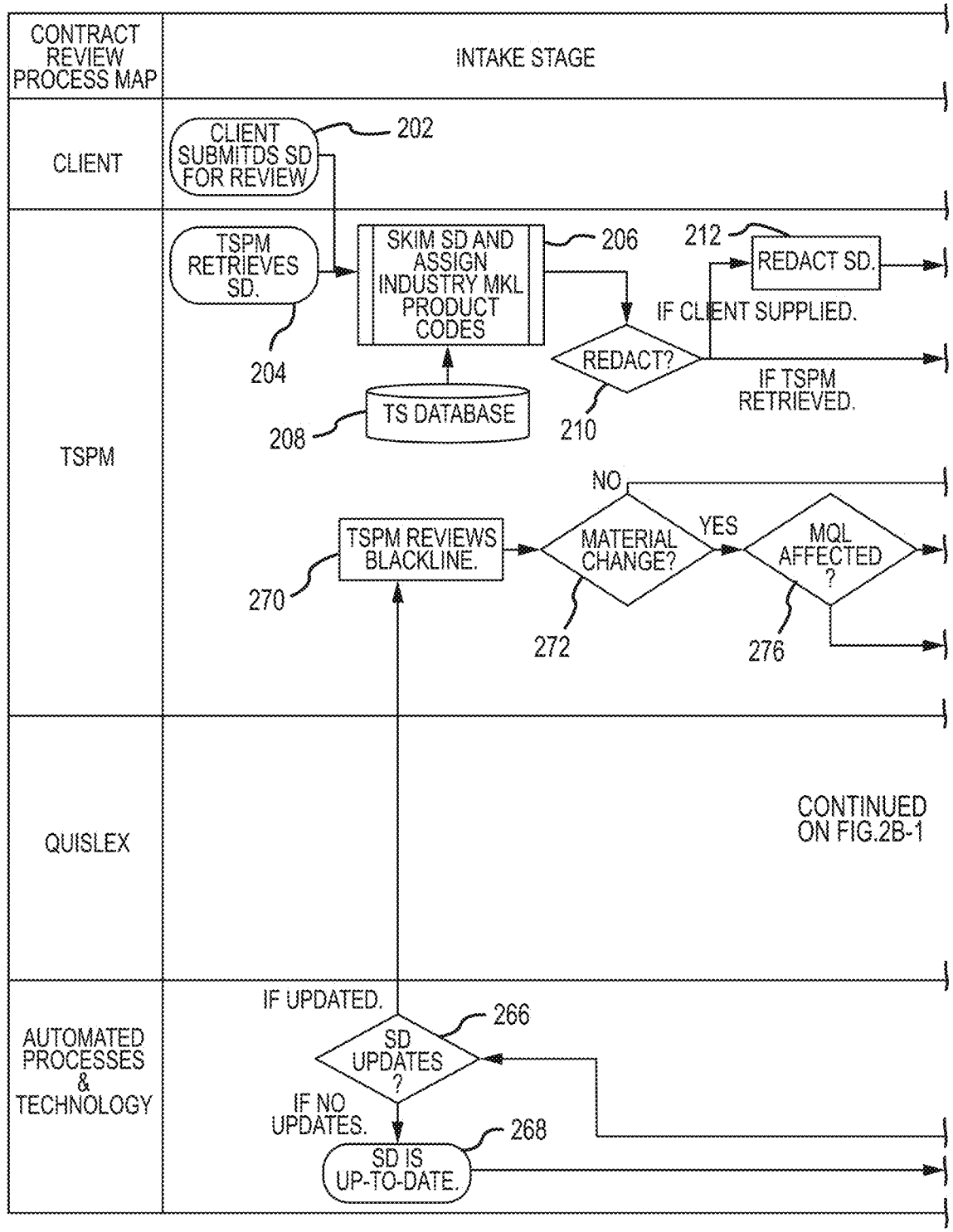
Figures 1, 2B:
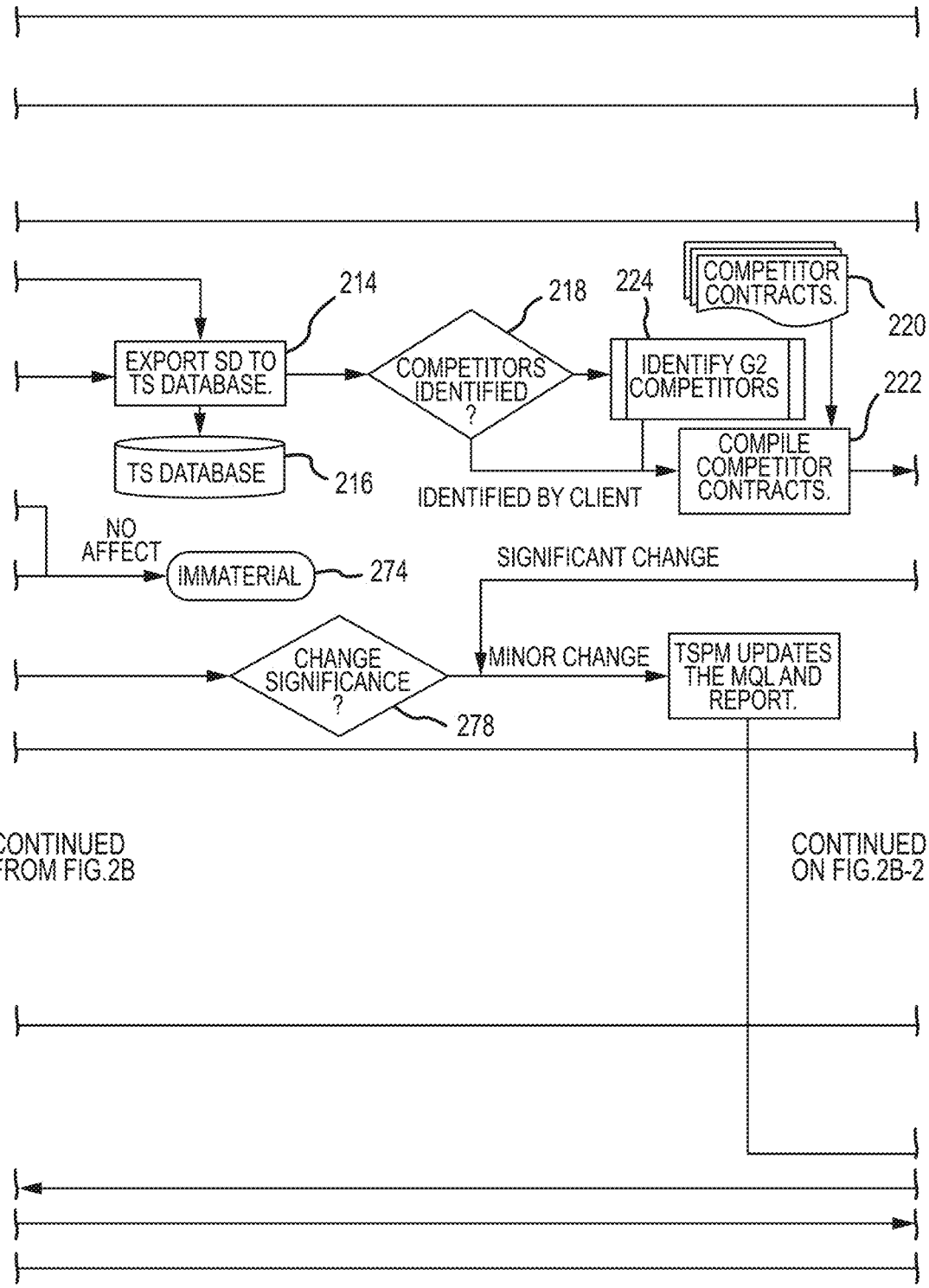
Figures 2, 2B:
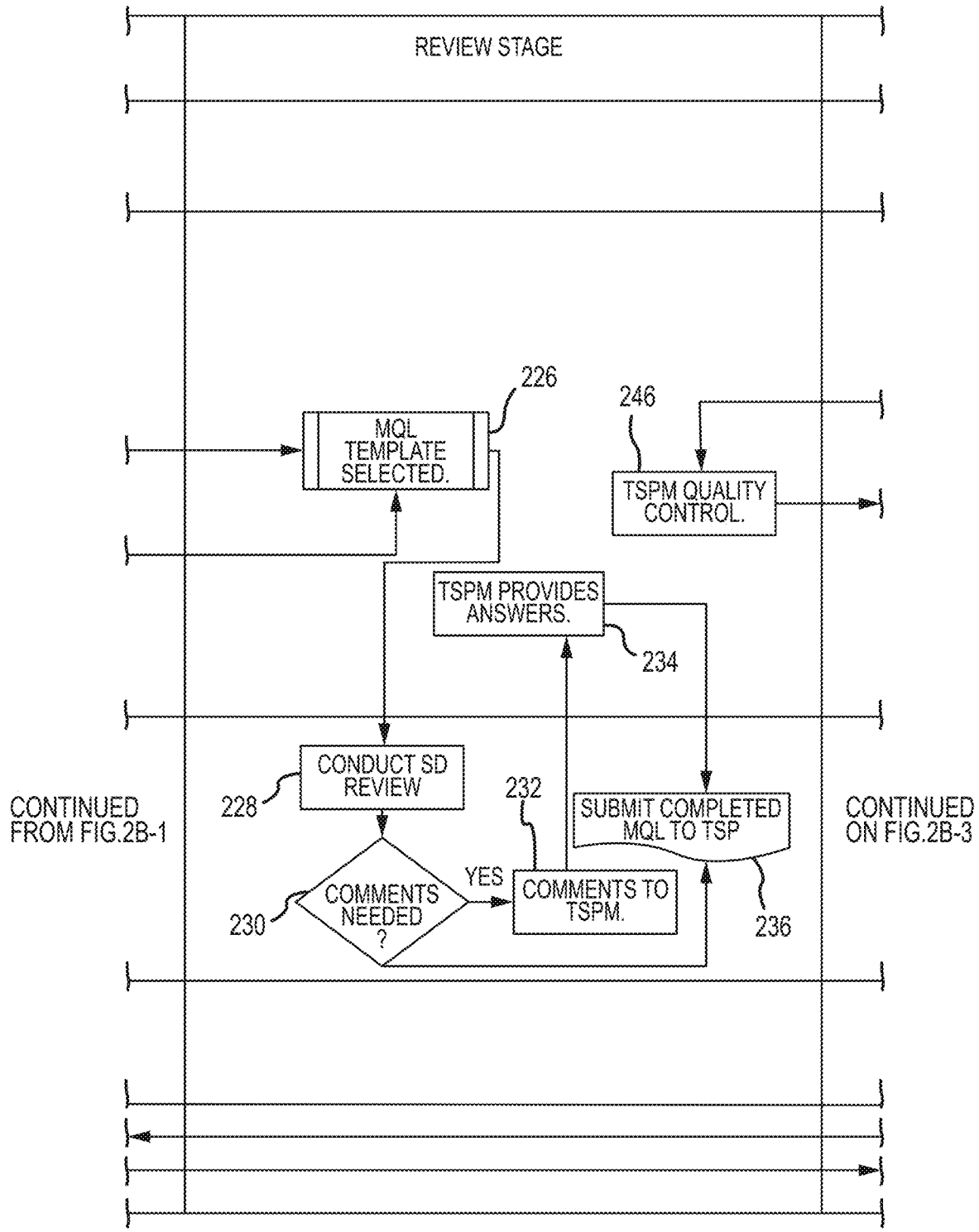
Figures 2, 2B, 3:
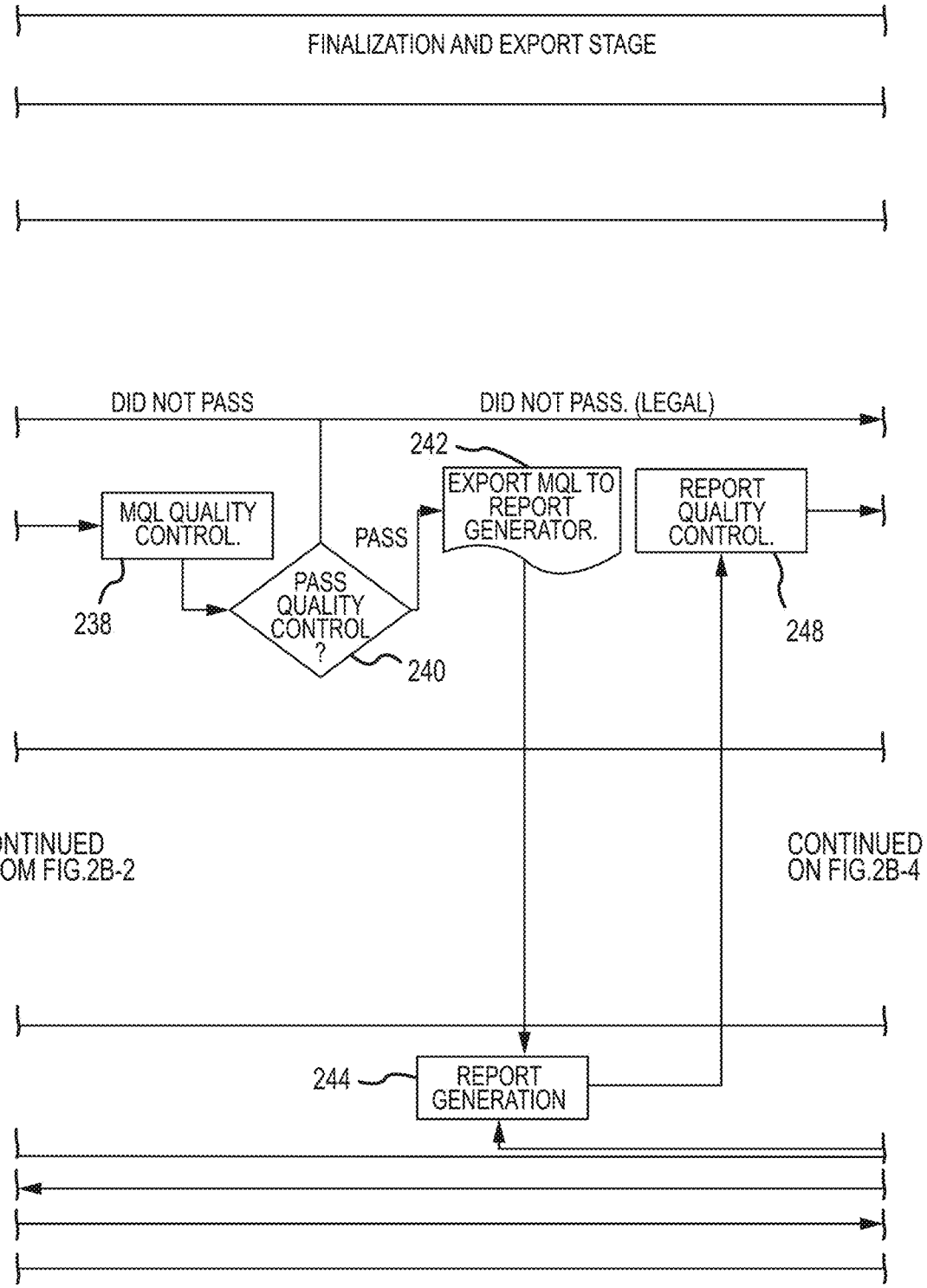
Figures 2, 2B, 3, 4:
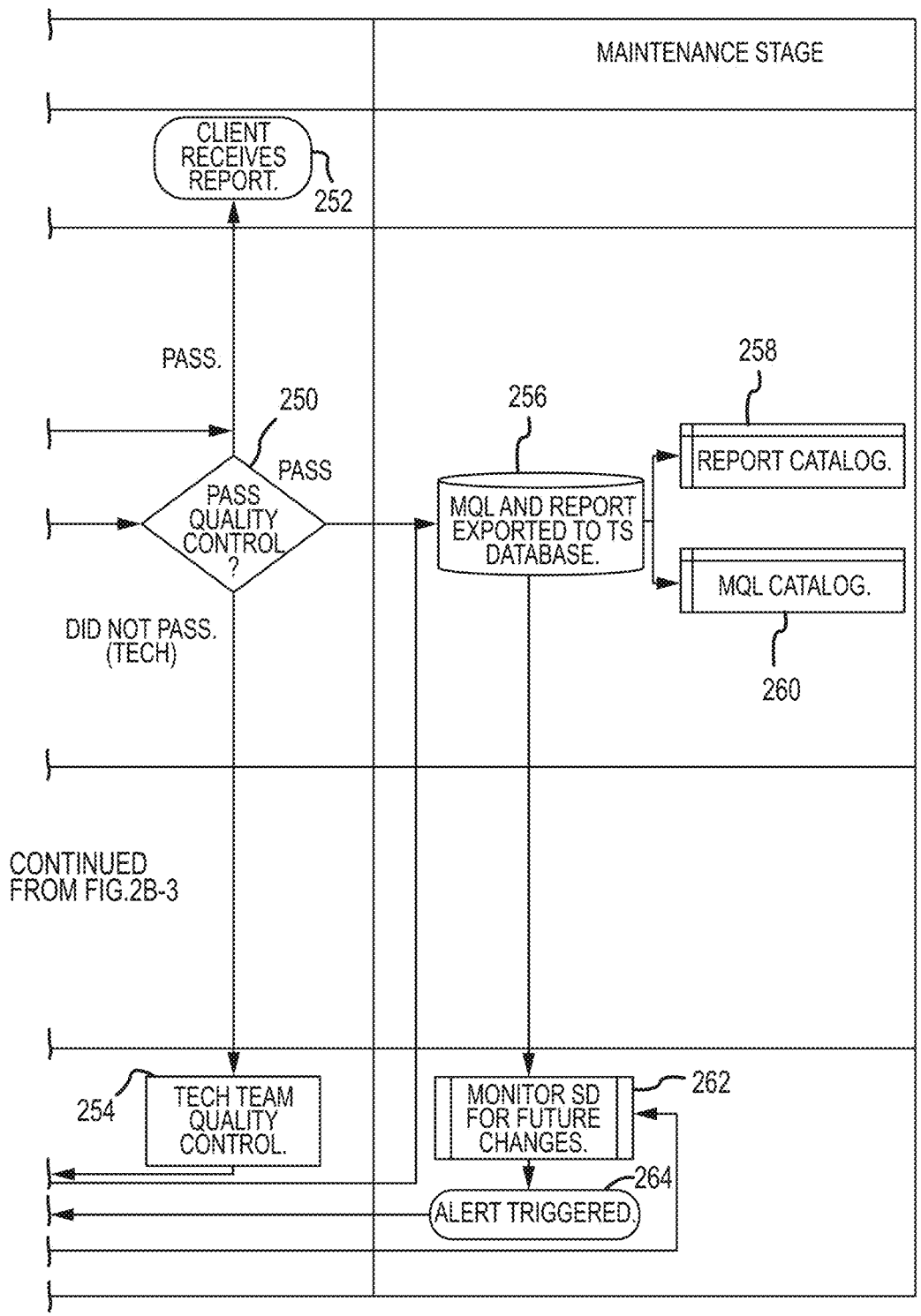
Figure 4:
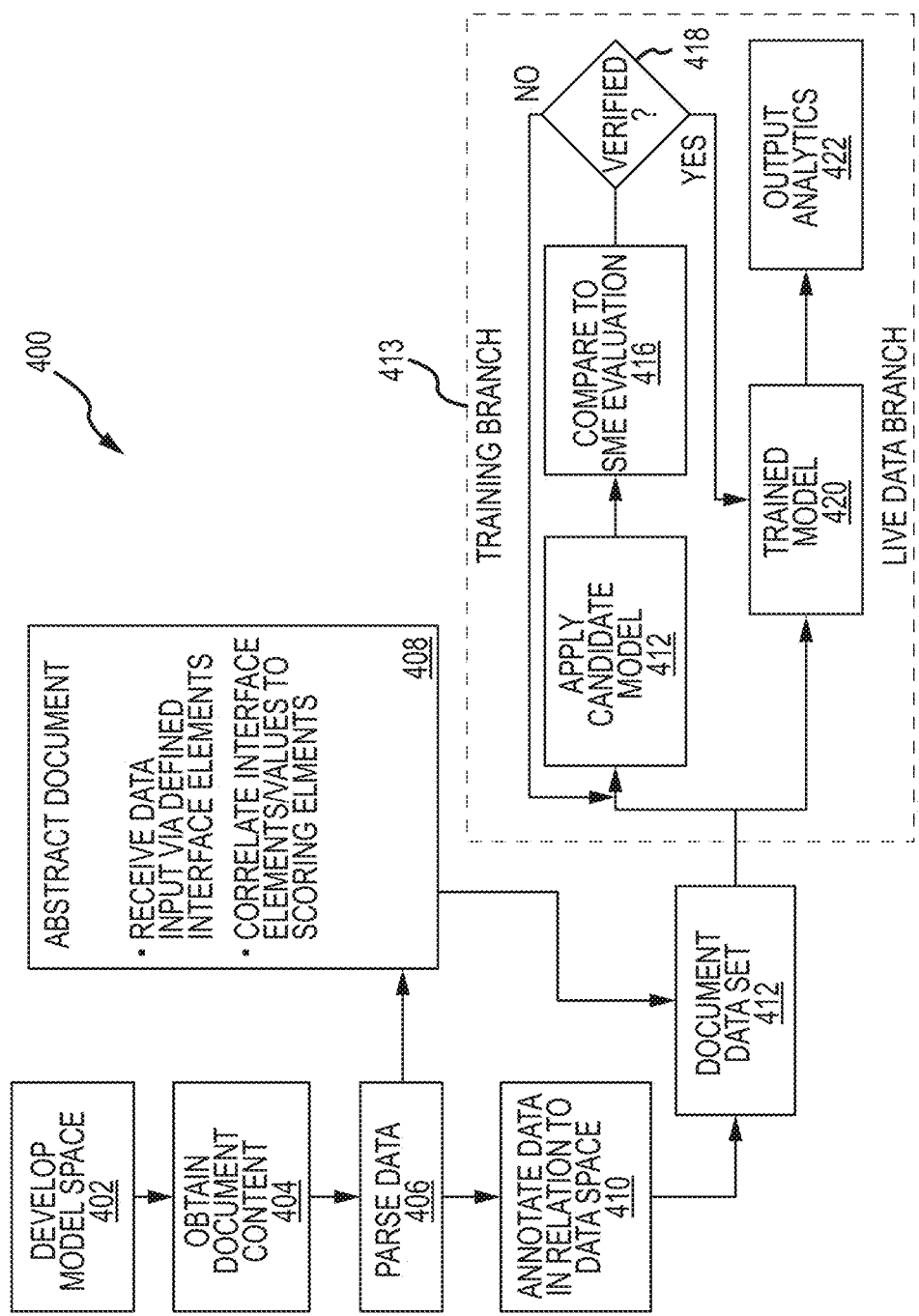
FIG. 4 illustrates the preprocessing and processing of documents in the document analysis system of FIG. 1.

FIG. 4 is a diagram illustrating the data preprocessing and processing 400 of a document management system in accordance with the present invention. The illustrated processing 400 is initiated by developing (402) a data model. It will be appreciated that various aspects of the processing 400 including scoring, rating, and executing machine learning tools depend, in part, on developing a model of the document analysis environment. For example, this may involve developing a system of classifications, fields, attributes, and values that can be used to characterize and analyze legal documents. In this regard such documents may be classified by, for example, type of contract (e.g., Vendor Agreement) and type of provision (Limitations on Vendor's Liability). Examples of fields, in the context of Limits on Vendor's Liability, include representations and warranties, indemnification by the Vendor, and limitations on liability. In the same context, attributes can include, for example, liability caps, exclusions on liability, and types of damages. Values may include, for example, numeric values such as the dollar amount of a liability, Boolean values like true or false, and other values. The exact structure of the data model and labels can vary, though it is useful to define a hierarchical schema to facilitate scoring and rating as well as to define features for use by the machine learning tool to develop data models that efficiently and accurately converge on desired targets or results.

The processing continues with obtaining (404) document content. For example, a user may upload one or more documents and related materials to the system 400. Alternatively, the system 400 may access publicly available documents, e.g., via the Internet. The system can then parse (406) the document content into chunks for analysis. For example, in the context of a Vendor Agreement or other contract, the document content may be parsed into provisions, e.g., associated with headings or paragraph numbers. These data chunks can then be annotated (410) in relation to the data space. For example, manual or automated textual analysis may be employed to identify a classification of each contract provision, such as indemnification, limitations on liability, representations and warranties, etc. These annotations can be used to compare the provisions to industry standards and implement other processing as described herein.

The parsed data chunks may also be used in connection with abstracting (408) the document. As will be described in more detail below, the abstracting function involves answering a series of standardized questions to assist in characterizing and scoring individual document provisions. This process entails a customized series of questions for different types of provisions and may be performed manually, may be semi-automated, or may be fully automated. In the case of a manual process, the system receives data input via defined interface elements associated with individual questions of the series. The data entered via the defined interface elements can then be correlated to scoring elements used for defining scores for provisions and overall documents as well as to determine rating information for the provisions and documents.

The annotated data chunks together with the abstracted document provide an input document dataset 412 for processing by the machine learning tool 413. The illustrated machine learning tool 413 includes a training branch and a live data branch. In the training branch, a candidate data model is first applied (414) to the document dataset to yield a proposed set of document analytics. For example, the document analytics may provide scores for individual document provisions in relation to favorability to a party, document ratings concerning clarity or fairness, or other analytics. The analytics can then be compared (416) to a subject matter expert evaluation. This comparison can be used to verify (418) the accuracy of the applied candidate model. Such comparison may be performed manually, may be semi-automated, or may be fully automated. Although a supervised system is illustrated, it will be apricated that an unsupervised system may alternatively be implemented in accordance with the present invention.

If the applied data model does not yield accurate analytics, an alternative candidate model may be applied. In this regard the alternative candidate model may involve different machine learning algorithms, different rules, different treatment of individual features, and the like. Once a candidate model has been verified, information concerning the applied candidate model may be used in defining or updating a trained model 420. For example, elements of the applied candidate model may be used to supplement or replace elements of the trained model 420. In this manner, the trained model is continually evolved to more completely and accurately analyze various types of provisions documents including new provisions and documents. It will be appreciated that the training branch may operate on all document datasets or selected document datasets. On the live data branch, the trained data model 420 is then applied to the document data set to yield output analytics 422. Such analytics may include scores for provisions and the document under analysis, ratings information, and textual analysis information as will be described in more detail below.

FIGS. 5-20 shows screenshots that further illustrate the document analysis functionality in accordance with one exemplary implementation of the present invention. As noted above, an early step in the analysis involves obtaining source documents at the system platform, for example, by uploading the documents. FIG. 5 shows a user interface screen that lists the source documents. The system can automatically navigate to the URLs of publicly available data and download and parse at least HTML, PDF, and Word documents. Alternatively, PDFs can be directly uploaded to the system platform for private agreements. The platform can then execute artificial intelligence or machine learning technology to convert the documents to plaintext and label sections with citations according to inferred document schemas as shown in FIG. 6.

In this case, the source documents include a primary agreement (a Primary Vendor Contract) and addenda or ancillary agreements (e.g., a data security policy/addendum and a service level agreement). The list also shows URLs associated with the documents, the date and time of the last successful scrape (download of the document from the URL), the agreement name, document type, and icons identifying a number of actions that can be taken with respect to each of the documents such as downloading the document or generating reports.

One of the actions that can be selected from the source document list is to view the provision. FIG. 8 shows a screen that may be presented in response to selecting the view action. The illustrated interface provides a citation for the provision and shows the source language as well as language recommended for the provision by the machine learning tool (which may be the same as or different than the source language). The recommended language may be shown in a clean format or red-lined in relation to the source text. In connection with the machine learning recommended language, the user is provided an option to accept the machine learning recommendation. If the user elects to accept the machine learning recommendation, the source contract language for the provision is replaced with the recommended machine learning language.

Reviewers can then review the plaintext documents generated by the machine learning tool, either accepting the recommended language as generated by the machine learning tool or manually entering edits. The reviewers can then develop an abstract for the source document(s) by answering multiple-choice questions on a topic-by-topic basis. FIG. 7 shows an associated user interface screen. The illustrated example shows questions that may be presented for a Primary Vendor Contract under the topic "Limits on Vendor's Liability." As shown, the questions include "Does the contract explicitly limit Vendor's liability?" and "What is the Vendor's liability cap?". The user can select an appropriate answer from a pull-down menu.

The interface also allows a user to select a confidence level for the answer. Each of these answers can be correlated to one or more scoring elements (e.g., favorability to the Vendor or Customer). Among other things, the confidence information may be used as a factor by the machine learning tool in generating analytics and to assist in rating contract clarity.

Figure 9:
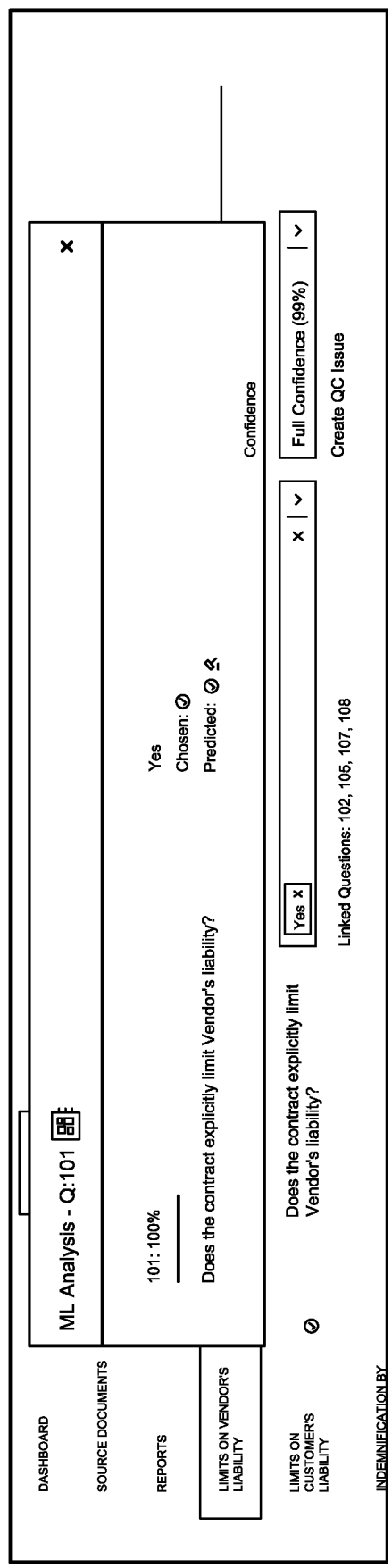
Figure 15:
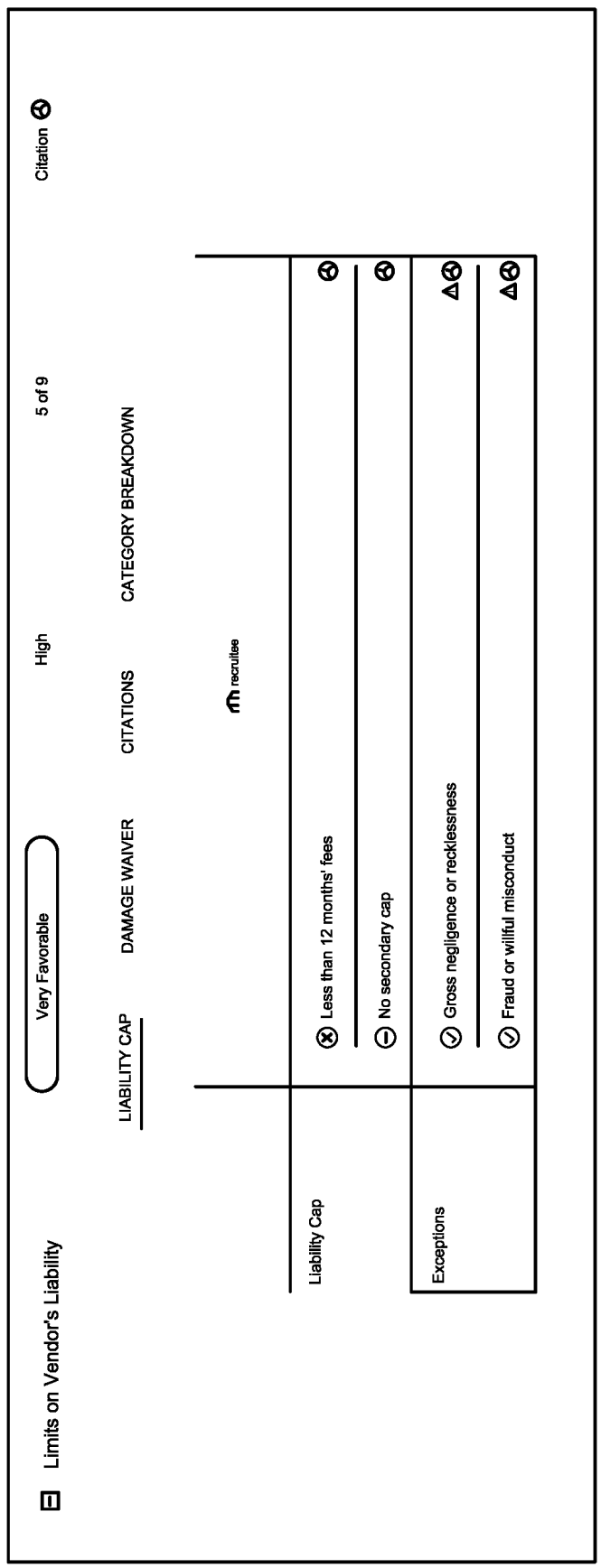

As noted above, the questions can be answered manually, semi-manually, or automatically. FIG. 9 shows a user interface screen that may be presented in connection with a semi-automatic system. In this case, the machine learning tool recommends answers to questions that the reviewer can elect to accept or not accept.

Once the review of the document is complete, the document and individual provisions can be scored or rated. For example, the scoring elements for individual provisions may be based on the answers entered or determined for those provisions during the abstracting process, alone or in combination with other analysis by the machine learning tool. In this regard, each answer of the pull-down menu of answer options may be associated with a scoring element and multiple answers may be used to compute a score for a provision, e.g., by averaging, weighted averaging, another algorithm, or based on a learning process of the machine learning tool.

FIG. 10 shows a user interface screen that may be used to present such scoring and rating information. As shown, a favorability score may be presented with a confidence assessment for each provision or topic. In addition, overall ratings for favorability and clarity may be provided as well as options to rerun scoring (e.g., after making or excepting suggested edits) and to hide topics (e.g., if the user is primarily interested in the overall score).

The scoring process may be configurable throughout the system, can be updated as desired, and can be tuned for different document topics. For example, system administrators can change the scoring elements applied to different answer choices, or the way that the answers to different questions are combined to yield a score, in order to change the impact on the score. FIG. 11 shows a user interface screen that illustrates how answers to individual questions are reflected in scoring elements. As shown, specific answers are associated with scoring elements that have directionality (positive or negative rating) and magnitudes. In this case, contracts that don't explicitly limit Vendor's liability get a positive addition to their score and those that completely disclaim all liability get a negative scoring element. It will be appreciated that the directionality can be changed (e.g., depending on which party is conducting the review) and the magnitude of a scoring element for a given answer to a given question may be changed (by a manual override) for a particular analysis (e.g., if the potential Vendor liability in the context of a particular agreement is deemed to be large and critical).

In addition to the scoring elements, system administrators may add textual attributes to some or all answer choices in order to provide plain language summaries in addition to the numeric scoring elements. This is shown in FIG. 12 where an answer title together with an "external guidance" entry provide a concise, plain language summary of the evaluation for a particular answer.

The scoring interfaces above may be made available to users or only to system administrators. In either case, clear and detailed reports may be presented to users upon completion of an analysis. The reports may include numerical and categorical ratings as well as detailed summaries and guidance for legal and business users. FIGS. 13-18 show examples of customer deliverable reports. Specifically, FIG. 13 shows overall rating/scoring information and FIGS. 14-18 provide summaries on a provision-by-provision basis. The overall rating/scoring interface includes, among other things, and overall Termscout™ rating (e.g., balanced, favorable to Vendor, very favorable to Vendor, etc.) and certification. It will be appreciated that this provides a simple and objective basis for a user to understand overall risk, make a decision concerning acceptance of the contract, or seek concessions from the counterparty.

If the user wishes to analyze the results more closely, e.g., to identify provisions most in need of concessions before acceptance, the user can consult the topic analysis screen (FIG. 14) and expand on individual topics to obtain information on factors that impacted the scoring element (FIG. 15), associated summary details (FIG. 16), ratings breakdowns (FIG. 17), and the associated citation/text (FIG. 18). In the illustrated example, the user has elected to expand the analysis for "Limits on Vendor's Liability" deemed to be very favorable (see FIG. 14). This enables the user to quickly access analysis details for any desired provision or topic.

Figure 19:
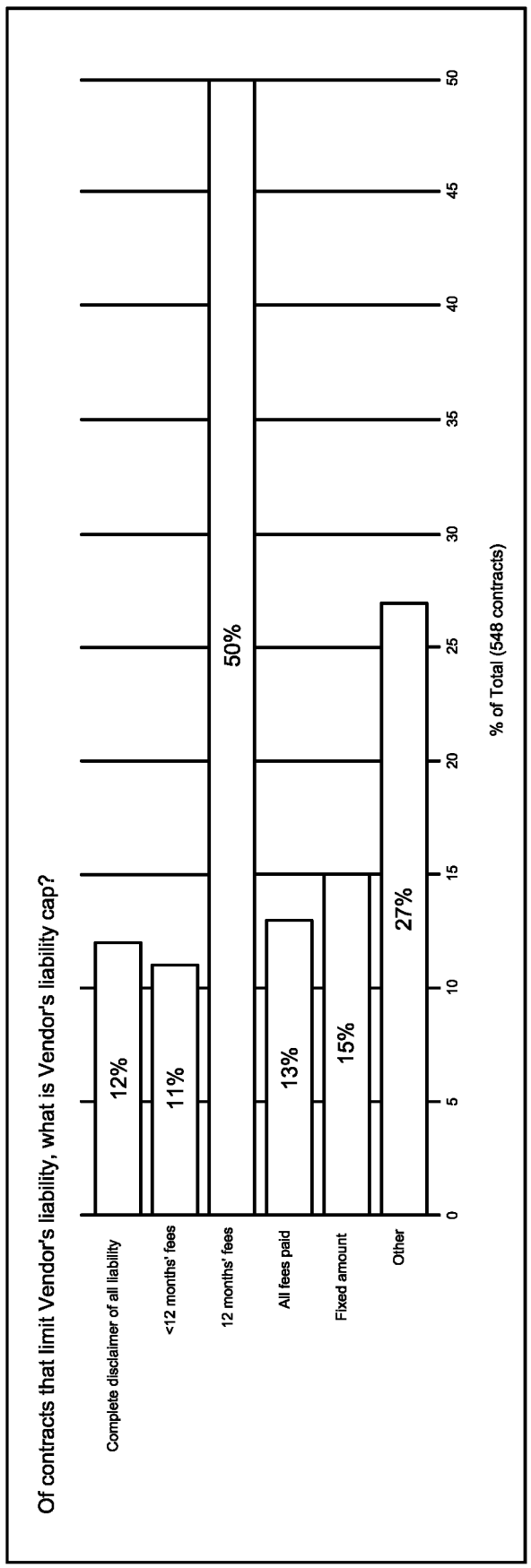
Figure 20:
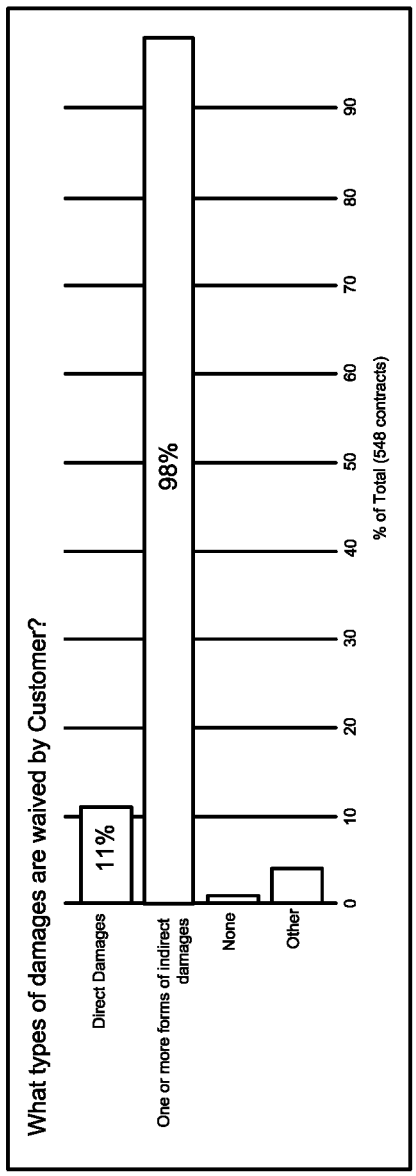

In addition, the scoring data for all documents or documents of a specific classification can be aggregated to provide a market-wide view. FIGS. 19-20 show user interface screens in this regard. Specifically, FIG. 19 shows market-wide percentages for various attributes related to Vendor liability caps. FIG. 20 has similar information regarding types of damages waived by a Customer. Users can thereby assess not only favorability but how particular attributes of the document rate in relation to the industry.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A document analysis system for analyzing a source document, comprising:
    an interface for receiving a source document;
    an input module for receiving classification information regarding said source document indicating one of a document type and a type of goods or services involved;
    a database of reference document provisions indexed by at least one of provision type and goods or services involved;
    a preprocessing module for developing abstracted document data, said preprocessing module providing a defined set of interface elements mapped to document scoring elements;
    a processing system for:
        receiving said source document, said classification information regarding said source document, and said abstracted document data;
        obtaining one or more parsed provisions of said source document;
        accessing said database to obtain reference information regarding said reference document provisions; and
        generating one or more metrics based on an analysis of said parsed document provisions, said scoring elements, and said reference information, wherein said generating involves employing a machine learning module to perform a textual analysis of said parsed document provisions in relation to said reference information; and
    an output module for generating a report using said metrics.

2. The document analysis system of claim 1, wherein said interface comprises a web-based interface for use in uploading said source document from a user system of said user to a processing platform of said document analysis system.

3. The document analysis system of claim 1, wherein said database includes document provisions indexed by document type and provision type.

4. The document analysis system of claim 1, wherein said input module comprises an interface for receiving classification information entered by a subject matter expert.

5. The document analysis system of claim 1, wherein said input module comprises an interface for receiving classification information developed by machine-based textual analysis.

6. The document analysis system of claim 1, wherein said defined set of interface elements comprises a defined series of questions concerning said source document, wherein answers to one or more of said questions correspond to individual ones of said scoring elements.

7. The document analysis system of claim 1 wherein multiple sets of questions are developed for use in connections with different source documents depending on said classification information.

8. The document analysis system of claim 1, wherein said report comprises a summary of source document provisions of said source document.

9. The document analysis system of claim 1, wherein said report comprises rating information regarding said textual analysis.

10. The document analysis system of claim 7, wherein said rating information relates to a favorability of one or more provisions of said source document with respect to one or more parties of said source document.

11. The document analysis system of claim 7, wherein said rating information comprises a score relating to a fairness of one or more provisions of said source document with respect to one or more parties of said source document.

12. The document analysis system of claim 1, wherein said report comprises a certification that said source document satisfies a defined standard relating to fairness.

13. The document analysis system of claim 1, wherein said report comprises information regarding most common terms in relation to a context of said source document.

14. The document analysis system of claim 1, further comprising an alert module for monitoring changes to a source document and selectively generating an alert based on said monitoring.

15. The document analysis system of claim 12, wherein said alert module is operative for periodically monitoring an online document.

16. The document analysis system of claim 12, wherein said alert module is operative for obtaining a revised version of said source document, identifying differences between said source document and said revised version, and analyzing said differences.

17. A method for analyzing a source document, comprising:
  providing an interface for receiving a source document;
  receiving classification information regarding said source document indicating one of a document type and a type of goods or services involved;
  providing a database of reference document provisions indexed by at least one of provision type and goods or services involved;
  operating a preprocessing module for developing abstracted document data, said preprocessing module providing a defined set of interface elements mapped to document scoring elements;
  operating a processing system for: receiving said source document, said classification information regarding said source document, and said scoring elements;
  obtaining one or more parsed provisions of said source document; accessing said database to obtain reference information regarding said reference document provisions; and
  generating one or more metrics based on an analysis of said parsed document provisions and said reference information, wherein said generating involves employing a machine learning module to perform a textual analysis of said parsed document provisions in relation to said reference information; and
  generating a report using said metrics.

18. The method of claim 17, wherein said database includes document provisions indexed by document type and provision type.

19. The method of claim 17, wherein said input module comprises an interface for receiving classification information developed by machine-based textual analysis.

20. The method of claim 17, wherein said input module comprises an interface for receiving classification information developed by machine-based textual analysis.

21. The method of claim 17, wherein said defined set of interface elements comprises a defined series of questions concerning said source document, wherein answers to one or more of said questions correspond to individual ones of said scoring elements.

22. The method of claim 17, further comprising an alert module for monitoring changes to a source document and selectively generating an alert based on said monitoring.

23. The document analysis system of claim 16, wherein said alert module is operative for periodically monitoring an online document.

24. The document analysis system of claim 16, wherein said alert module is operative for obtaining a revised version of said source document, identifying differences between said source document and said revised version, and analyzing said differences.

* * * * *

UNITED STATES PATENT AND TRADEMARK OFFICE
CERTIFICATE OF CORRECTION

PATENT NO. : 12,008,316 B2
APPLICATION NO. : 17/408005
DATED : October 22, 2024
INVENTOR(S) : Otto Hanson et al.

Page 1 of 1

It is certified that error appears in the above-identified patent and that said Letters Patent is hereby corrected as shown below:

In the Specification

Column 4, Line 26, replace "2A-2I" with --2A - 2B-4--

Column 7, Line 24, replace "2A-2I" with --2A - 2B-4--

Signed and Sealed this
Eighteenth Day of March, 2025

Coke Morgan Stewart
*Acting Director of the United States Patent and Trademark Office*